US011100173B2

(12) United States Patent
Dilts et al.

(10) Patent No.: US 11,100,173 B2
(45) Date of Patent: *Aug. 24, 2021

(54) AUTOLAYOUT OF VISUALIZATIONS BASED ON GRAPH DATA

(71) Applicant: Lucid Software, Inc., South Jordan, UT (US)

(72) Inventors: Benjamin N. Dilts, Bluffdale, UT (US); Tyler J. Davis, McCammon, ID (US); Sean P. McKenna, Midvale, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/445,040

(22) Filed: Jun. 18, 2019

(65) Prior Publication Data

US 2020/0401623 A1    Dec. 24, 2020

(51) Int. Cl.
*G06F 16/00* (2019.01)
*G06F 16/904* (2019.01)
(Continued)

(52) U.S. Cl.
CPC ........ *G06F 16/904* (2019.01); *G06F 16/2282* (2019.01); *G06F 16/9024* (2019.01)

(58) Field of Classification Search
CPC ............... G06F 16/904; G06F 16/2282; G06F 16/9024; G06F 16/954; G06F 16/957
(Continued)

(56) References Cited

U.S. PATENT DOCUMENTS

| 5,414,809 A | 5/1995 | Hogan |
| 6,636,250 B1 | 10/2003 | Gasser |

(Continued)

FOREIGN PATENT DOCUMENTS

| JP | 2004-252539 A | 9/2004 |
| JP | 2006-526840 | 11/2006 |

(Continued)

OTHER PUBLICATIONS

International Search Report and Written Opinion issued in PCT Application No. PCT/US2020/018343, dated Jun. 23, 2020.

(Continued)

*Primary Examiner* — Thanh-Ha Dang
(74) *Attorney, Agent, or Firm* — Maschoff Brennan

(57) ABSTRACT

A method may include receiving input effective to select a visualization type of multiple different visualization types to apply to a visualization of data. The selected visualization type may be associated with a contract. Each of the different visualization types may be associated with a specific contract. Each contract may include a corresponding schema that specifies a set of data fields and one or more relationships between data fields in the set to generate and display a corresponding visualization having a visualization type. The method may include mapping at least some data of a data source to the contract such that the contract is satisfied. The contract may specify that the data of the data source be in a graph format. The method may include displaying the visualization of the at least some data of the data source based on the contract, the displayed visualization having the selected visualization type.

20 Claims, 12 Drawing Sheets

(51) Int. Cl.
*G06F 16/22* (2019.01)
*G06F 16/901* (2019.01)

(58) Field of Classification Search
USPC ............................................... 707/736
See application file for complete search history.

(56) References Cited

U.S. PATENT DOCUMENTS

| | | | |
|---|---|---|---|
| 6,982,708 B1 | 1/2006 | Mah et al. | |
| 7,149,975 B1 | 12/2006 | Johnson et al. | |
| 7,800,613 B2* | 9/2010 | Hanrahan | G06T 11/206 |
| | | | 345/440 |
| 8,364,820 B2 | 1/2013 | Madani et al. | |
| 8,375,068 B1 | 2/2013 | Platt et al. | |
| 8,694,906 B2 | 4/2014 | Cole et al. | |
| 8,788,931 B1* | 7/2014 | Chen | G06F 40/151 |
| | | | 715/234 |
| 9,201,558 B1* | 12/2015 | Dingman | G06F 15/16 |
| 9,619,827 B1 | 4/2017 | Joneja | |
| 9,633,076 B1 | 4/2017 | Morton | |
| 9,684,761 B1 | 6/2017 | Lamant | |
| 9,922,108 B1* | 3/2018 | Meiklejohn | G06F 16/289 |
| 10,114,884 B1* | 10/2018 | Valensi | G06F 16/285 |
| 10,175,854 B2 | 1/2019 | Ramanathan et al. | |
| 10,616,078 B1 | 4/2020 | Thomas | |
| 10,684,998 B2 | 6/2020 | Ardila et al. | |
| 2002/0059183 A1 | 5/2002 | Chen | |
| 2004/0168115 A1 | 8/2004 | Bauernschmidt et al. | |
| 2005/0179684 A1 | 8/2005 | Wallace | |
| 2007/0214179 A1 | 9/2007 | Hoang | |
| 2008/0306985 A1 | 12/2008 | Murray et al. | |
| 2009/0299920 A1 | 12/2009 | Ferris et al. | |
| 2009/0313576 A1 | 12/2009 | Neumann et al. | |
| 2010/0005386 A1 | 1/2010 | Verma et al. | |
| 2010/0153340 A1 | 6/2010 | Yasrebi | |
| 2011/0016099 A1 | 1/2011 | Peer et al. | |
| 2011/0055756 A1 | 3/2011 | Chen et al. | |
| 2011/0078171 A1 | 3/2011 | Wagenblatt et al. | |
| 2011/0109472 A1 | 5/2011 | Spirakis et al. | |
| 2011/0179370 A1 | 7/2011 | Cardno et al. | |
| 2011/0239164 A1 | 9/2011 | Saraiya et al. | |
| 2011/0261049 A1 | 10/2011 | Cardno et al. | |
| 2011/0290348 A1 | 12/2011 | Miyazawa et al. | |
| 2011/0295865 A1* | 12/2011 | Carroll | G06F 16/86 |
| | | | 707/756 |
| 2011/0295999 A1 | 12/2011 | Ferris et al. | |
| 2012/0226808 A1 | 9/2012 | Morgan | |
| 2013/0031143 A1 | 1/2013 | Ktiyar | |
| 2013/0097544 A1 | 4/2013 | Parker et al. | |
| 2013/0232452 A1 | 9/2013 | Krajec et al. | |
| 2013/0304925 A1 | 11/2013 | Ferris et al. | |
| 2014/0006421 A1 | 1/2014 | Van Ham | |
| 2014/0071138 A1 | 3/2014 | Gibson et al. | |
| 2014/0181718 A1 | 6/2014 | Gao et al. | |
| 2014/0195515 A1 | 7/2014 | Baker et al. | |
| 2014/0208215 A1 | 7/2014 | Deshpande | |
| 2014/0244627 A1 | 8/2014 | Bhatia | |
| 2014/0258446 A1 | 9/2014 | Bursell | |
| 2014/0278808 A1 | 9/2014 | Lyoob et al. | |
| 2014/0324710 A1 | 10/2014 | Thibout et al. | |
| 2014/0365655 A1 | 12/2014 | Takahashi et al. | |
| 2015/0019301 A1 | 1/2015 | Jung et al. | |
| 2015/0019569 A1 | 1/2015 | Parker et al. | |
| 2015/0294488 A1 | 10/2015 | Iwasaki et al. | |
| 2015/0312421 A1 | 10/2015 | Leemet et al. | |
| 2015/0339379 A1 | 11/2015 | Inagaki | |
| 2015/0365299 A1 | 12/2015 | Schaerges et al. | |
| 2016/0034835 A1 | 2/2016 | Levi et al. | |
| 2016/0042252 A1 | 2/2016 | Sawhney et al. | |
| 2016/0042253 A1 | 2/2016 | Sawhney et al. | |
| 2016/0070451 A1* | 3/2016 | Kim | G06Q 10/06 |
| | | | 715/765 |
| 2016/0070541 A1 | 3/2016 | Lee | |
| 2016/0112277 A1 | 4/2016 | Nagarajan et al. | |
| 2016/0162598 A1 | 6/2016 | Schaerges et al. | |
| 2016/0371312 A1 | 12/2016 | Ben-Aharon et al. | |
| 2017/0031958 A1 | 2/2017 | Miller | |
| 2017/0132300 A1* | 5/2017 | Sekar | G06F 16/26 |
| 2017/0228447 A1 | 8/2017 | Catania et al. | |
| 2017/0293415 A1* | 10/2017 | Mackinlay | G06F 16/283 |
| 2017/0351753 A1 | 12/2017 | Duncker et al. | |
| 2018/0039657 A1 | 2/2018 | Pandit | |
| 2018/0067998 A1 | 3/2018 | Sherman et al. | |
| 2018/0091579 A1 | 3/2018 | Thomas | |
| 2018/0121482 A1 | 5/2018 | Heen et al. | |
| 2018/0150436 A2 | 5/2018 | Ben-Aharon et al. | |
| 2018/0173790 A1 | 6/2018 | Krishnamacharya | |
| 2018/0189330 A1* | 7/2018 | Doan | G06F 16/2282 |
| 2018/0196863 A1* | 7/2018 | Meiklejohn | G06F 16/212 |
| 2018/0232340 A1 | 8/2018 | Lee | |
| 2018/0337794 A1 | 11/2018 | Casaletto et al. | |
| 2019/0012736 A1 | 1/2019 | Courbage et al. | |
| 2019/0018904 A1* | 1/2019 | Russell | G06F 16/24578 |
| 2019/0129968 A1* | 5/2019 | Neylan | G06F 3/0643 |
| 2019/0213099 A1 | 7/2019 | Schmidt et al. | |
| 2019/0286620 A1* | 9/2019 | Al-Haimi | G06N 3/0454 |
| 2019/0294473 A1 | 9/2019 | Martin et al. | |
| 2019/0340038 A1 | 11/2019 | Molloy et al. | |
| 2019/0384836 A1* | 12/2019 | Roth | G06F 16/9024 |
| 2020/0004865 A1 | 1/2020 | Dilts et al. | |
| 2020/0004866 A1 | 1/2020 | Dilts et al. | |
| 2020/0004872 A1 | 1/2020 | Dilts et al. | |

FOREIGN PATENT DOCUMENTS

| | | |
|---|---|---|
| JP | 2016-085761 A | 5/2016 |
| KR | 10-2015-0031502 | 3/2015 |
| WO | 2012-118726 A2 | 9/2012 |
| WO | 2018/145112 | 8/2014 |

OTHER PUBLICATIONS

Office Action issued in U.S. Appl. No. 16/697,004, dated May 7, 2020.

Office Action issued in U.S. Appl. No. 16/024,544, dated Jun. 23, 2020.

Office Action issued in U.S. Appl. No. 16/024,533, dated Jul. 2, 2020.

Office Action issued in U.S. Appl. No. 16/024,551, dated Aug. 10, 2020.

PCT/US2018/017105 International Search Report and Written Opinion, dated Apr. 6, 2018 (22 pgs).

International Search Report and Written Opinion issued in PCT Application No. PCT/US2019/040001, dated Oct. 24, 2019.

International Search Report and Written Opinion issued in PCT Application No. PCT/US2019/040004, dated Oct. 24, 2019.

International Search Report and Written Opinion issued in PCT Application No. PCT/US2019/040006, dated Oct. 24, 2019.

Office Action issued in U.S. Appl. No. 16/024,533, dated Mar. 18, 2020.

Office Action issued in U.S. Appl. No. 16/024,551, dated Apr. 2, 2020.

How to Use ViewModel in Asp. Net MVC with Example, by Tutlane, archived on Archive.org on Oct. 26, 2017. https://web.archive.org/web/20171026085504/https://www.tutlane.conn/tutorial/aspnet-nnvc/how-to-use-viewnnodel-in-asp-net-nnvc-with-example. (Year: 2017).

Single asp.net MVC application using multiple databases, by Adriano Silva, StackOverflow, Mar. 22, 2012, https://stackoverflow.conn/questions/9823330/single-asp-net-nnvc-application-using-multiple-databases. (Year: 2012).

Refresh table using AJAX in asp.net MVC, by Voila Daniel, StackOverflow, Jul. 28, 2016, https://stackoverflow.com/questions/38635966/refresh-table-using-ajax-in-asp-net-mvc. (Year: 2016).

Upload and Read CSV File in asp.net MVC, by TechBrij, Jan. 17, 2015, https://techbrij.com/read-csv-asp-net-mvc-file-upload. (Year: 2015).

PCT International Search Report and Written Opinion as issued in corresponding application No. PCT/US2020/036239, dated Sep. 11, 2020.

(56) References Cited

OTHER PUBLICATIONS

PCT International Search Report and Written Opinion issued in corresponding application No. PCT/US2020/062438, dated Mar. 23, 2021.
PCT International Search Report and Written Opinion issued in corresponding application No. PCT/US2020/062437, dated Mar. 19, 2021.
Notice of Allowance issued in corresponding U.S. Appl. No. 16/024,533, dated Oct. 20, 2020.
Notice of Allowance issued in corresponding U.S. Appl. No. 16/024,544, dated Sep. 30, 2020.
Office Action issued in corresponding U.S. Appl. No. 16/024,551, dated Jan. 14, 2021.
Office Action issued in corresponding U.S. Appl. No. 16/697,004, dated Oct. 26, 2020.
Office Action issued in corresponding U.S. Appl. No. 16/696,998, dated Feb. 8, 2021.
Non-Final Office Action issued in corresponding U.S. Appl. No. 16/697,004, dated Mar. 31, 2021.
Final Office Action issued in corresponding U.S. Appl. No. 16/024,551, dated May 12, 2021.

* cited by examiner

AUTOLAYOUT OF VISUALIZATIONS BASED ON GRAPH DATA

FIELD

The embodiments discussed herein are related to autolayout of visualizations based on graph data.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate visualizations on a computer based on the structured source data. For example, a user may manually create from the structured source data a diagram that depicts data objects and their relationships, e.g., by manually creating in a graphical drawing canvas graphical objects that represent the data objects and their relationships.

Sometimes the underlying structured source data may be updated and the user may desire the updates to be reflected in the visualization. One existing option to update the visualization includes manually generating the visualization again from scratch based on the updated structured source data and/or manually modifying the visualization to reflect the updates the updates are relatively few, which can be bothersome and/or time-consuming when the visualization includes many nodes.

The subject matter claimed herein is not limited to implementations that solve any disadvantages or that operate only in environments such as those described above. Rather, this background is only provided to illustrate one example technology area where some implementations described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to autolayout of visualizations based on graph data.

In an example embodiment, a method to generate a visualization of data from a data source based on a contract may include receiving input effective to select a visualization type of multiple different visualization types to apply to a visualization of data. The selected visualization type is associated with a contract. Each of the different visualization types is associated with a specific contract of multiple contracts. Each corresponding contract includes a corresponding schema that specifies a set of data fields and one or more relationships between data fields in the set to generate and display a corresponding visualization having a corresponding visualization type. The method may also include mapping at least some data of a data source to the contract such that the contract is satisfied. The contract may specify that the data of the data source be in a graph format. The method may also include displaying the visualization of the at least some data of the data source based on the contract, the displayed visualization having the selected visualization type.

In another example embodiment, a non-transitory computer-readable storage medium has computer-executable instructions stored thereon that are executable by a processor device to perform or control performance of operations that may include receiving input effective to select a visualization type of multiple different visualization types to apply to a visualization of data. The selected visualization type is associated with a contract. Each of the different visualization types is associated with a specific contract of multiple contracts. Each corresponding contract includes a corresponding schema that specifies a set of data fields and one or more relationships between data fields of the set to generate and display a corresponding visualization having a corresponding visualization type. The operations may also include mapping at least some data of a data source to the contract such that the contract is satisfied. The contract may specify that the data of the data source be in a graph format. The operations may also include displaying the visualization of the at least some data of the data source based on the contract, the displayed visualization having the selected visualization type.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
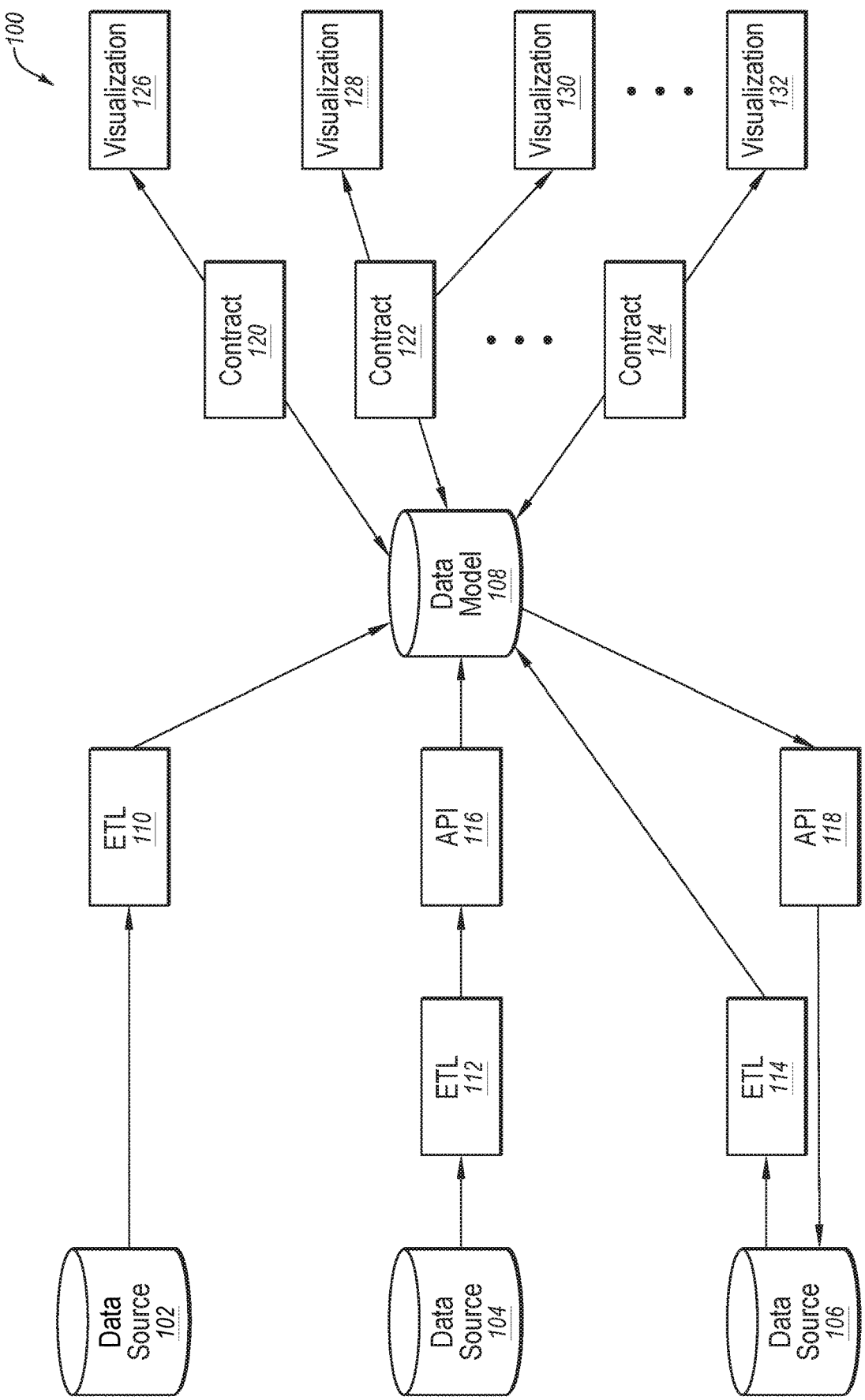
FIG. 1 is a block diagram of an example architecture to generate, customize, and/or interact with visualizations of data from data sources based on contracts.

U.S. patent application Ser. No. 16/024,533 (the '533 application) titled AUTOLAYOUT OF VISUALIZATIONS BASED ON CONTRACT MAPS and filed Jun. 29, 2018 is incorporated herein by reference in its entirety.

Diagrams representing source data may be generated manually or automatically. Manually generating diagrams and other visualizations can be time-consuming, tedious, and/or prone to user error. Automatically generating diagrams can be less time-consuming, less tedious, and/or less prone to user error than manually generating diagrams. However, applications to automatically generate diagrams from source data may be source-dependent, e.g., such applications may be limited to use with a particular type or format of source data, and/or may be limited to generating only one specific type of diagram.

In addition, while some automatic diagram generation applications may allow a user to choose a particular theme to apply to an entire diagram, such applications generally do not permit the user to customize specific objects in or represented in the diagram.

Further, any changes the user makes to the diagram typically do not affect the underlying source data. Thus, even if some applications permit the rearrangement of objects in the diagram and/or the relationships between objects in the diagram, such changes may be limited to the diagram and may not be propagated back to the source data.

Some embodiments described herein may address one or more of the foregoing problems with some visualization applications. For example, at least one embodiment may automatically generate diagrams based on source data from any source, which source data may be in virtually any format at the source. For example, the source data may be in a tabular format, a graph format, another appropriate format, or some combination thereof. In this and other embodiments, the source data may be translated from its original format to a standardized format. The translation may be implemented by an extract, transform, and load (ETL) process. Alternatively or additionally, various portions of the same source data may be used to generate visualizations of various visualization types that may be associated with different data contracts (hereinafter "contracts"). Each contract may generally specify a structure of data necessary to generate a visualization with a specific visualization type associated with the contract.

In at least one embodiment, each data object or graph object of the source data may be represented in a visualization by a set of one or more graphical objects. The set of one or more graphical objects in the visualization may include a default set that may be customized for a given data object or graph object of the source data. For example, the default set of one or more graphical objects in the visualization for a given data object or graph object of the source data may include a default outline shape with a default outline line type and a default font style (font type, font size, font color). For one or more of the data objects or graph objects of the source data, the default set of one or more graphical objects in the visualization may be customized as a custom set of one or more graphical objects, e.g., to include more or fewer graphical objects than in the default set, to include graphical objects with a custom outline shape, a custom outline line type, a custom font style, or other custom aspects. The customization may be applied, e.g., manually to one or more specific data objects or one or more specific graph objects of the source data, or may be applied, e.g., automatically through conditional customization to any data object or graph object of the source data that satisfies a corresponding condition.

In at least one embodiment, any changes made to a visualization may implicate changes to the underlying source data, and/or may be propagated back to the source data to update the source data consistent with the changes to the visualization. In this and other embodiments, data of the data source may be mapped to a contract such that the contract is satisfied. The visualization may be displayed with multiple graphical objects that graphically represent the data of the data source. One or more graphical objects in the visualization and/or relationships between graphical objects may be altered. Semantically these alterations may be understood as implicating changes to data objects or graph objects in the data of the data source. Accordingly, the data objects or graph objects in the data of the data source may be altered consistent with the alterations to the graphical objects in the visualization. In some embodiments, all changes to the visualization and/or implicated changes to the underlying source data may be saved locally, e.g., while a user has the visualization open and is editing it. At some point, e.g., when the user is closing the visualization, all of the locally saved changes may be presented to the user and the user may, e.g., choose to propagate a given implicated change back to the source data, save a given change locally without propagating it back to the source data, and/or completely discard a given change such that it is neither propagated back to the source data nor saved in the visualization. Alternatively or additionally, a user may be prompted to choose what to do about each change every time a changes is made, rather than going through multiple changes at once.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example architecture 100 to generate, customize, and/or interact with visualizations of data from data sources based on graph data, arranged in accordance with at least one embodiment described herein. The architecture 100 may include one or more data sources 102, 104, 106 and a data model 108.

Each of the data sources 102, 104, 106 may include one or more collections of data, referred to as data collections. The data collections may be data collections of a corresponding entity, such as a business, a company, an agency, a municipality, an individual and/or other entity. In an example, the data source 102 and/or one or more data collections thereon may be owned by or otherwise associated with one entity, the data source 104 and/or one or more data collections thereon may be owned by or otherwise associated with another entity, and the data source 106 and/or one or more data collections thereon may be owned by or otherwise associated with still another entity. Alternatively or additionally, two or more data sources may be owned by or otherwise associated with the same entity.

Each of the data sources 102, 104, 106 and/or the data collections may include, for example, a human resources (HR) system or database such as BAMBOOHR or WORK-DAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a cloud infrastructure provider such as AWS, GOOGLE CLOUD, or MICROSOFT AZURE; a database schema (e.g., to generate Entity Relationship Diagrams); a service-oriented architecture; physical network discovery tools; custom-built technical systems that can be modeled similar to a network; or other suitable data source and/or data collection. The data in each of the data sources 102, 104, 106 and/or the data collections may have a specific format, which may be different and/or the same from one data source 102, 104, 106 to another and/or from one data collection to another. Some example data formats include proprietary formats, Structured Query Language (SQL), Comma Separated Values (CSV), Extensible Markup Language (XML), Protocol Buffers (protobuf), YAML Ain't Markup Language (YAML), Tom's Obvious Minimal Language (TOML), adjacency lists, and JavaScript Object Notation (JSON). Some example graph formats include proprietary formats, adjacency matrices, and incidence (connection) matrices.

To allow the same or similar operations (e.g., generation of visualizations) to be performed on data from different ones of the data sources 102, 104, 106, from different data collections, and/or with different data formats at the data sources 102, 104, 106, the data from the data sources 102, 104, 106 may be standardized before being saved in the data model 108. Accordingly, the architecture 100 may include one or more ETL modules 110, 112, 114 to translate data of the data sources 102, 104, 106 from a first format (e.g., proprietary, SQL, JSON, or other data format) to a standardized format in which the data is saved on the data model 108. Alternatively or additionally, the data of the data sources 102, 104, 106 may be transformed into one or more in-memory intermediate data structures that are not permanently saved. In some embodiments, the data of the data sources 102, 104, 106 may be translated from the first format to a standardized graph format. In these and other embodiments, the data of the data source may be translated to graph data. For example, in some embodiments, the first format may include a tabular data and the data of the data source may be translated from the tabular format to a graph format. As another example, in some embodiments, the first format may include a first graph format and the data of the data source may be translated from the first graph format to a second graph format. As another example, in some embodiments, the first format may include a graph format and the data of the data source may be translated from the graph format to a tabular format.

In some embodiments, a service provider that provides and/or supports the data model 108 and/or provides various operations (e.g., generation of visualizations) that can be done on data in the data model 108 may provide the ETL module 110 to translate data of the data source 102 from one or more non-standardized formats to a standardized format that is standardized for the data model 108 and the operations provided by the service provider. Alternatively or additionally, the service provider may provide an application programming interface 116 that permits the entity associated with the data source 104 or some other entity the ability to generate a proprietary ETL module, e.g., the ETL module 112, to translate data of the data source 104 from one or more non-standardized formats to the standardized format. Alternatively or additionally, the ETL module 114, whether provided by the service provider or a different entity, may translate data of the data source 106 from one or more non-standardized formats to the standardized format, while an API 118 may allow the service provider to update source data of the data source 106 responsive to, e.g., a change made to a visualization of at least some of the source data of the data source 106.

With continued reference to FIG. 1, the architecture 100 may further include one or more contracts 120, 122, 124 to generate one or more visualizations 126, 128, 130, 132 of data from the data sources 102, 104, 106. Each of the contracts 120, 122, 124 and other contracts described herein may specify a structure of data necessary to produce one or more visualizations, such as the visualizations 126, 128, 130, 132. For example, in some embodiments, each of the contracts 120, 122, 124 may specify that the data of the data sources 102, 104, 106 be in a particular graph format. As another example, in some embodiments, one or more of the contracts 120, 122, 124 may specify that the data of the data source 102, 104, 106 be in a particular tabular format.

Each of the visualizations 126, 128, 130, 132 may have a visualization type associated with the corresponding contract 120, 122, 124. For example, generating a visualization of a specific visualization type may require one or more specific contracts that specify the structure of data necessary to produce the visualization with the specific visualization type. In some cases, multiple visualization types may be associated with the same contract. For example, generating a visualization with any of two or more specific visualization types may require the same specific contract that specifies the structure of data necessary to produce the visualization with either of the two or more specific visualization types. For example, the visualization 128 may have one visualization type that is associated with the contract 122, while the visualization 130 may have a different visualization type that is also associated with the contract 122. In other cases, some contracts may each be associated with only a single visualization type.

Figure 2:
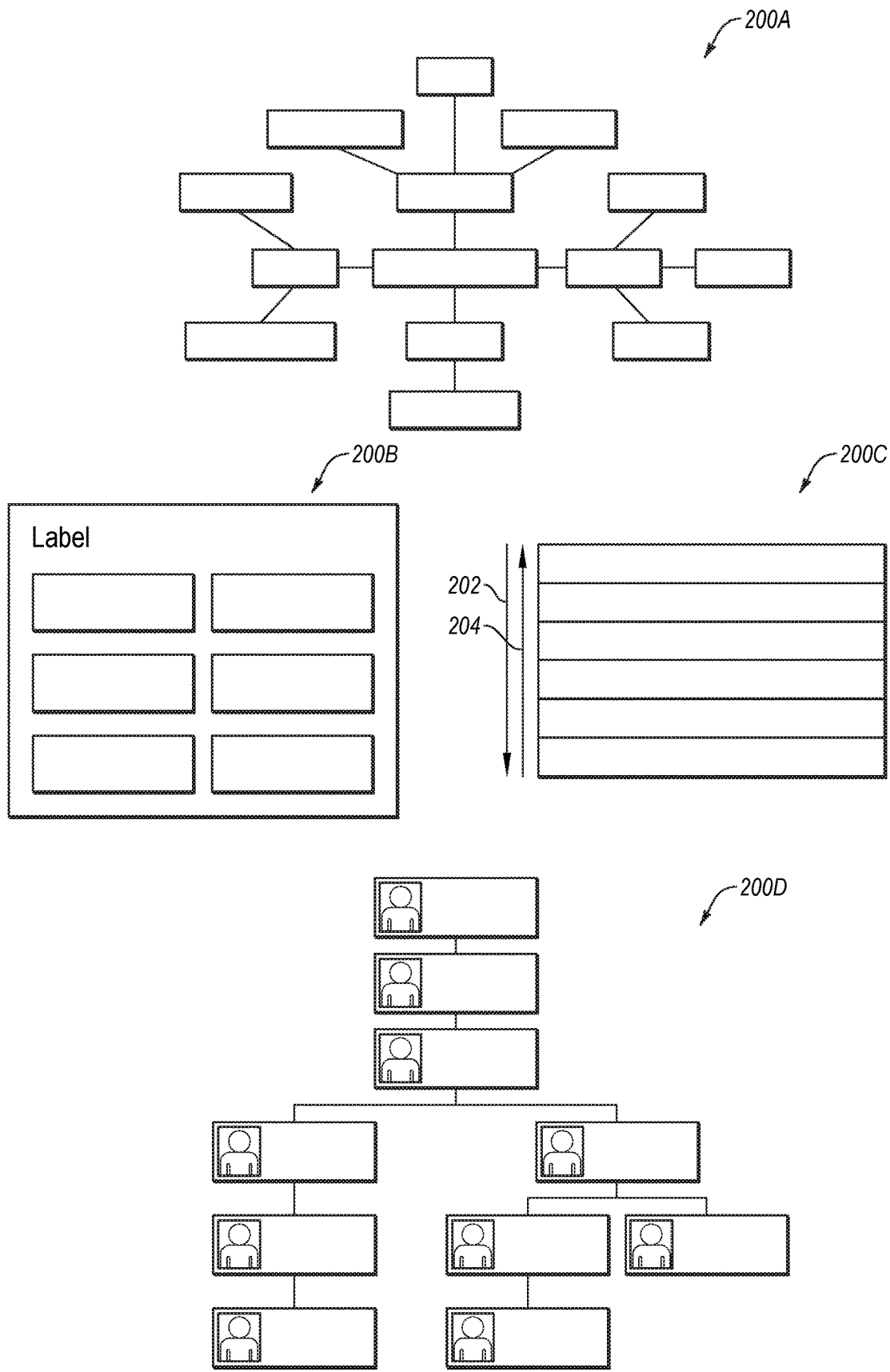
FIG. 2 illustrates various example visualizations with various example visualization types.

FIG. 2 illustrates various example visualizations 200A, 200B, 200C, 200D (hereinafter collectively "visualizations 200") with various example visualization types, arranged in accordance with at least some embodiments described herein. The visualization 200A has a mind map visualization type that organizes information in a hierarchical manner to show relationships among pieces of a whole. The visualization 200B has a container visualization type in which visualization 200C has an abstraction layers visualization type that may, e.g., generalize conceptual models or algorithms with increasing order of complexity in one direction and increasing order of abstraction in the other direction, as indicated by the arrows 202, 204. The visualization 200D has a hierarchical organizational chart visualization type that shows the structure of an organization and the relationships and relative ranks of its parts and positions/jobs, where every entity in the organization, except one in this example, is subordinate to a single other entity. More generally, the visualizations that may be generated according to embodiments described herein may have any suitable visualization type, such as organizational chart (e.g., hierarchical organizational chart, matrix organizational chart, flat organizational chart), container, mind map, abstraction layer, logical network diagram, flowchart, supply chain process map, concept map, or other suitable visualization type.

Returning to FIG. 1, each of the contracts 120, 122, 124 and other contracts described herein may include one or more corresponding schema that describe a corresponding set of and corresponding type of fields required to satisfy the corresponding contract 120, 122, 124. Alternatively or additionally, each schema may specify a set of one or more data fields corresponding to specific data from a corresponding one of the data sources 102, 104, 106, e.g., in a standardized format in the data model 108, and one or more relationships between data fields in the set. Each schema may be casually referred to as a shape of underlying source data. E.g., data of a corresponding one of the data sources 102, 104, 106 that satisfies a particular schema, or has a particular "shape", may be used to generate a visualization having the visualization type described by the particular schema.

To generate a corresponding one of the visualizations 126, 128, 130, 132 of data from a given one of the data sources 102, 104, 106, a user may select a visualization type that is associated with one or more of the contracts 120, 122, 124 to apply to the visualizations 126, 128, 130, 132. At least some data from the corresponding one of the data sources 102, 104, 106, e.g., in the standardized format in the data model 108, may then be mapped to the associated one of the contracts 120, 122, 124 such that the contracts 120, 122, 124 and/or the corresponding schema is satisfied. In at least one embodiment, the contracts 120, 122, 124 may be considered satisfied if the mapping identifies specific data from the data sources 102, 104, 106 that satisfies and/or is compatible with the set of data fields and relationships of the schema of the contracts 120, 122, 124.

After the mapping, the corresponding one of the visualizations 126, 128, 130, 132 may then be displayed based on the corresponding contract 120, 122, 124, where the displayed visualization 126, 128, 130, 132 has the selected visualization type.

Figure 3:
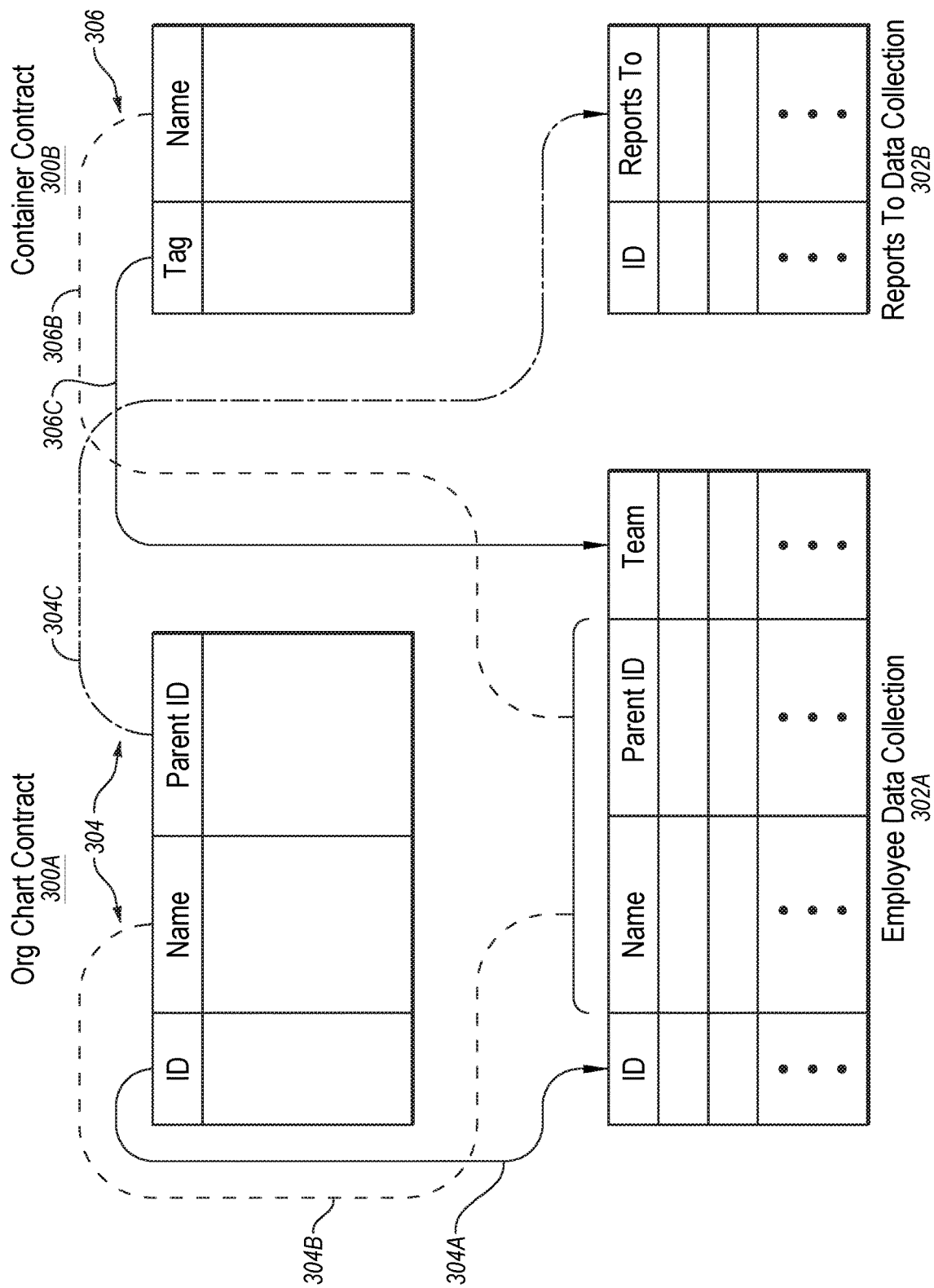
FIG. 3 illustrates two example contracts.

FIG. 3 illustrates two example contracts 300A, 300B (collectively "contracts 300") and example data collections 302A, 302B (collectively "data collections 302") from a data source, arranged in accordance with at least one embodiment described herein.

The contract 300A may be or include a simple organizational chart contract to generate visualizations with an organizational chart visualization type, such as one or more of hierarchical organizational chart, matrix organizational chart, or flat organizational chart. The contract 300A includes a schema that defines three data fields—ID, Name, and Parent ID—that have a specified relationship in which the ID, Name, and Parent ID are associated with a specific entity (e.g., an employee that has an ID and a Name and that reports to another entity (e.g., a manager or supervisor) identified by the Parent ID) as a data object to be represented in the visualization, where the Parent ID for one data object is the ID for another data object. The contract 300A may permit one or a few data objects, e.g., corresponding to one or more owners, executives, or other entities of an organization that are at a top of a hierarchy of the organization and that do not report to anyone else, to not have a Parent ID.

In at least one embodiment, a contract such as the contract 300A, and/or a schema included in the contract, may include one or more optional data fields and/or relationships to describe additional information (e.g., the contract 300A may include a field that indicates an order in which data or relationships should appear in the visualization). For example, some employees may report to multiple managers or supervisors and the contract 300A may have two or more "Parent ID" fields instead of one, where one of the "Parent ID" fields is required and one or more other "Parent ID" fields are optional.

In some embodiments, an organizational chart contract may be more complex or different than the contract 300A of FIG. 3, e.g., may include more, fewer, and/or different data fields than illustrated in FIG. 3. For example, such organization chart contracts may include an employee photo Uniform Resource Identifier (URI) data field, an office location data field, and/or other data fields.

The contract 300B may be or include a container contract to generate visualizations with a container visualization type. The contract 300B includes a schema that defines two data fields—Tag and Name—that have a specific relationship in which the Tag and Name are associated with a specific entity (e.g., an employee that has a Name and that is on a specific team within an organization where the team is designated by a Tag) as a data object to be represented in the visualization, where one or more multiple data objects may have the same Tag. In some embodiments, a container contract may be more complex or different than the contract 300B of FIG. 3, e.g., may include more, fewer, and/or different data fields than illustrated in FIG. 3.

The data collection 302A may include an employee data collection that includes employee IDs, First Names, Last Names, and Team designations for each employee of an organization. The data collection 302A may include data from a data source, e.g., an HR database, and/or the data may be in a standardized, tabular format, e.g., In the data model 108 of FIG. 1.

The data collection 302B may include a reports to data collection that includes employee IDs for the employees and an identification of, e.g., a manager, a supervisor, or other individual in the organization each employee reports to. The identification of the manager, supervisor, or other individual in the organization that each employee reports to may include the manager's or supervisor's employee ID in an example embodiment, or other identifying information for the manager or supervisor. The data collection 302B may include data from a data source, e.g., a spreadsheet that identifies each employee and each employee's supervisor, and/or the data may be in a standardized, tabular format, e.g., in the data model 108 of FIG. 1.

FIG. 3 additionally illustrates contract maps 304, 306 to map data from the data collections 302 to the contracts 300. Each contract map 304, 306 may include one or more pointers to data of a data source, e.g., to data of one or both of the data collections 302 in these examples. In particular, the contract map 304 includes pointers 304A, 304B, and 304C and the contract map 306 includes pointers 306A, 306B. The pointers 304A, 304B, 304C, 306A, 306B point to the appropriate data of the data source(s) 302 to satisfy the corresponding contract 300.

For example, the pointer 304A of the contract map 304 specifies that data for the ID data field in the contract 300A is in the ID field of the data collection 302A. The pointer 304B of the contract map 304 specifies that data for the Name data field in the contract 300A is a concatenation of the data in the First Name field and the Last Name field of the data collection 302A. The pointer 304C of the contract map 304 specifies that data for the Parent ID data field in the contract 300A is in the Reports To field of the data collection 302B.

Analogously, the pointer 306A of the contract map 306 specifies that data for the Tag data field in the contract 300B is in the Team field of the data collection 302A. The pointer 306B of the contract map 306 specifies that data for the Name data field in the contract 300B is a concatenation of the data in the First Name field and the Last Name field of the data collection 302A.

Accordingly, the data source that includes the data collections 302 may include one or more data objects and/or graph objects. Each visualization may graphically represent one or more of the data objects and/or graph objects of the data source using one or more graphical objects. In particular, each data object and/or graph object of the data source may be represented by or otherwise associated with a set of one or multiple graphical objects in the visualizations. For example, a data object and/or graph object of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to in the visualizations.

Alternatively or additionally, in at least one embodiment, one graphical object in the visualizations may represent multiple data objects and/or graph objects in the data source. As described below, for example, some portions of an organizational chart or other visualization may be selectively collapsed, in which case multiple employees (e.g., multiple data objects) may be hidden and may instead be represented by a suitable graphical object in the visualization. As another example, an entire team of multiple employees may be represented by a single shape for the team.

Each visualization described herein may be generated based on a contract, e.g., the contracts 300, from a semantic layout and a concrete layout. The semantic layout may be generated based on a corresponding contract, such as the contracts 300, and may specify one or more of relative locations, arrangement, and relationship of multiple data objects and/or graph objects in the data source to represent in a visualization. The concrete layout may specify a set of one or more graphical objects to display for each of the data objects and/or graph objects in the data source to be represented in the visualization. In some embodiments, the concrete layout may specify a default set of one or more graphical objects in the visualization for each of the data objects and/or graph objects in the data source. Alternatively or additionally, the concrete layout may specify a custom set of one or more graphical objects in the visualization for a subset of the data objects and/or graph objects in the data source. In at least one embodiment, the custom set of one or more graphical objects in the visualization may be specified in the concrete layout responsive to receiving input, e.g., from a user, effective to alter the default set to the custom set for the subset of the data objects and/or graph objects in the data source. The customization may be provided for individual data objects and/or graph objects in the data source and/or for classes or groups of data objects and/or graph objects in the data source by using conditional customization.

The custom set of one or more graphical objects in the visualization may be customized and different in at least one respect compared to the default set of one or more graphical objects in the visualization, although there may be some overlap between the custom set and the default set. For example, the default set of one or more graphical objects in the visualization may include an outline with a specific shape, color, line type (e.g., solid, dashed, dot-dash, etc.), and line weight and text of a specific font, size, and color. In comparison, at least one of the foregoing outline shape, outline color, outline line type, outline line weight, text font, text size, and/or text color may be different for the custom set of one or more graphical objects in the visualization.

In some examples, graphical objects in the visualization that represent data objects and/or graph objects in the data source may be altered, e.g., by a user. The alterations to the graphical objects in the visualization may implicate changes to the data objects and/or graph objects in the data source. For example, in a visualization with an organizational chart visualization type, if a connector or other graphical object that connects an employee to the employee's manager or supervisor is modified to connect the employee to a different manager, supervisor, or other entity, this may indicate that the user desires to change the employee's manager or supervisor. As another example, in a visualization with a container chart visualization type, assume containers represent different groups or teams, with different boxes or text within each container representing members of the corresponding group or team; if a box or text representing a specific member of one group or team is moved by a user from a first container of a first group or team to a different second container of a second group or team, this may indicate the user desires to change the specific member from being on the first group or team to being on the second group or team. As still another example, in a visualization with a logical network diagram visualization type, if a connector between a port of a first device and a first port of a second device is altered to connect the port of the first device to a second port of the second device or to a port of a third device, this may indicate the user desires to change the port(s) over which the first and second devices communicate and/or the device(s) which devices communicate with each other.

At least one embodiment described herein includes updating the underlying source data to reflect changes made to visualizations. In the examples provided above, for instance, source data may be updated by, e.g., changing an employee's manager or supervisor at a corresponding data source, changing an employee or other entity's membership in a group or team at the data source, and/or changing the ports over which and/or the devices with which a device communicates at the data source. Changes to the underlying data may be implemented automatically in response to alteration of the visualization, or after querying the user about whether to change the underlying data and receiving an affirmative response to the query. The user may be queried about whether to update the underlying data every time an alteration is made, or in batches, e.g., periodically or when the user closes the visualization after making the a set of one or more alterations.

Figure 4:
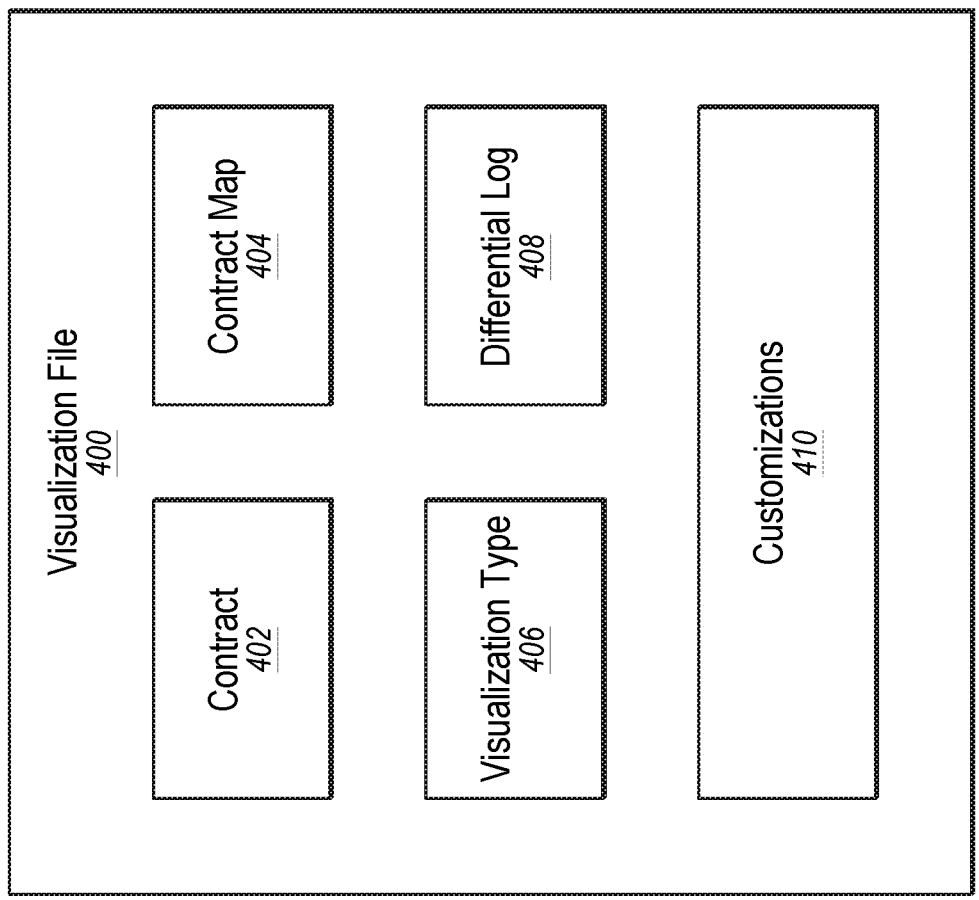
FIG. 4 illustrates an example visualization file from which a visualization may be generated.

FIG. 4 illustrates an example visualization file 400 from which a visualization may be generated, arranged in accordance with at least one embodiment described herein. The visualization file 400 may be stored on a user device and/or on a server device or in other storage location. The visualization file 400 may include a contract 402, a corresponding contract map 404 and/or transformation rules, a visualization type 406, a differential log 408, and customizations 410.

The contract 402 may include or correspond to one or more of the contracts described elsewhere herein. The contract map 404 and/or transformation rules may include or correspond to one or more of the contract maps and/or transformation rules described elsewhere herein. The visualization type 406 may include or correspond to one or more of the visualization types described elsewhere herein and/or may a user's selection of a specific visualization type to apply to a visualization the user desires to generate.

The differential log 408 may include a list of one or more alterations the user has made to the visualization, e.g., to one or more graphical objects, and/or a list of one or more implicated changes to the underlying data of the data source used to generate the visualization.

The customizations 410 may include customizations to a set of one of more graphical objects in a visualization for each of one or more specific data objects and/or graph objects in data of a data source and/or conditional customization that customizes the set of one or more graphical objects in a visualization for each data object and/or graph object in the data of the data source that satisfies a predetermined condition. In some embodiments, the differential log 408 may include information that creates a link between the customizations and the data of the data source, the graph data (e.g., the derived graphs), or some combination thereof. In these and other embodiments, the differential log 408 may include identifying information for each of the graphical objects in the visualization. The identifying information may permit any of the customizations made to the visualization to not change or alter other customizations or alterations made to the visualization. For example, removal of an Employee ID in the visualization may not alter customizations to styling or alterations to other data fields in the graphical objects in the visualization.

The visualization file 400 does not include the underlying source data, e.g., data, data objects, graph objects, or some combination thereof from the data source. Thus, when a user "opens" the visualization file 400 to display and view the corresponding visualization or syncs to the data source, the visualization may be regenerated from the source data. As such, changes made to the source data may be reflected in the regenerated visualization without the user having to manual update the visualization.

Figure 5:
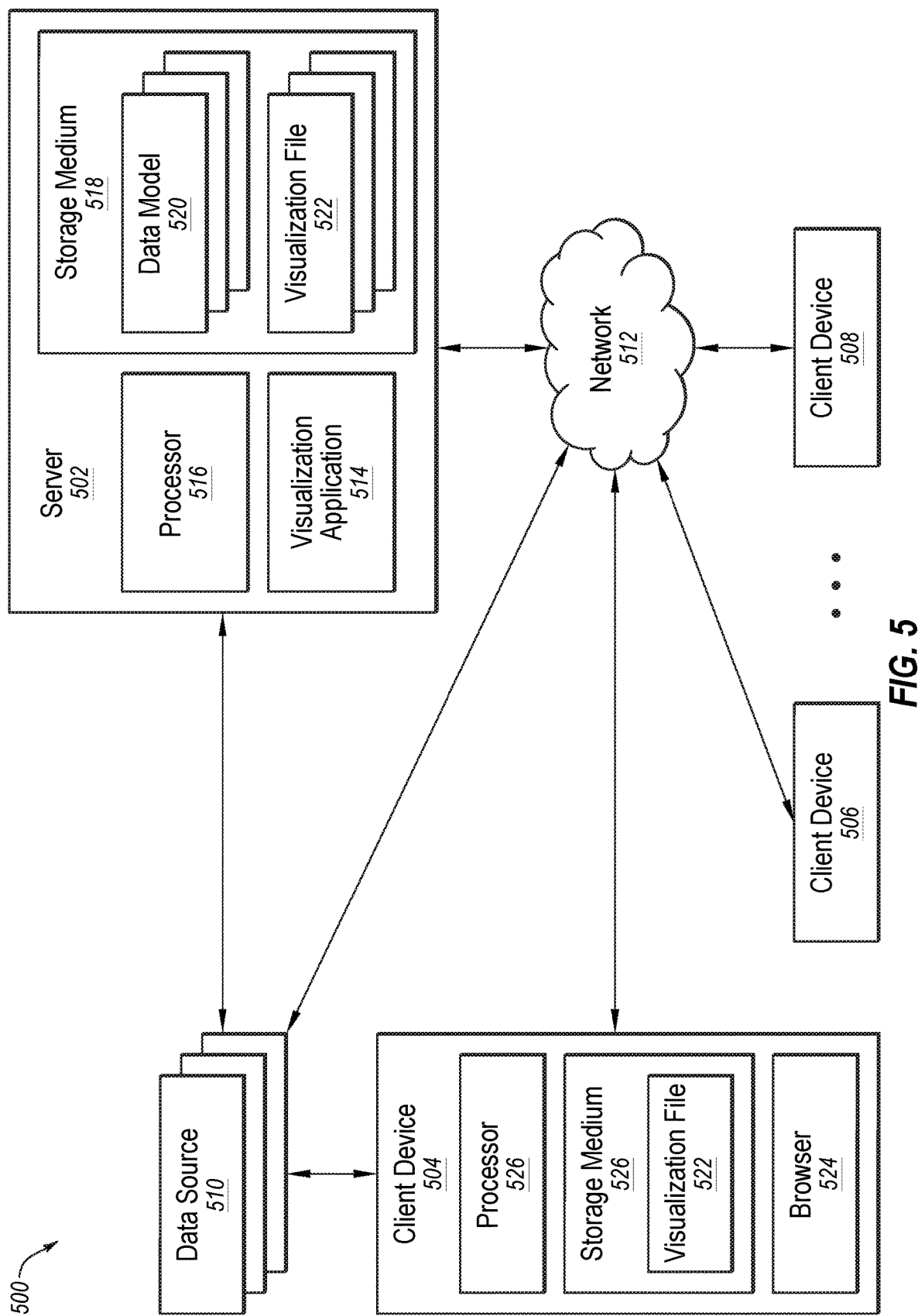
FIG. 5 is a block diagram of an example operating environment in which the architecture of FIG. 1 may be implemented.

FIG. 5 is a block diagram of an example operating environment 500 in which the architecture 100 of FIG. 1 may be implemented, arranged in accordance with at least one embodiment described herein. The operating environment 500 may include a server 502 and one or more client devices 504, 506, 508. The server 502 and/or the client devices 504, 506, 508 may be configured to generate, customize, and/or interact with visualizations of source data from one or more data sources 510 based on contracts. Alternatively or additionally, the source data of the data sources 510 may be updated based on changes to the visualizations.

Each of the one or more data sources 510 may include or correspond to the data sources described elsewhere herein.

Although one server 502 and three client devices 504, 506, 508 are illustrated in FIG. 5, the operating environment 500 may more generally include one or more servers 502 and one or more client devices 504, 506, 508. In these and other embodiments, the operating environment 500 may include other servers and/or devices not illustrated in FIG. 5.

The operating environment 500 may additionally include a network 512. In general, the network 512 may include one or more wide area networks (WANs) and/or local area networks (LANs) that enable the server 502, the client devices 504, 506, 508, and the data sources 510 to communicate with each other. In some embodiments, the network 512 may include the Internet, including a global internetwork formed by logical and physical connections between multiple WANs and/or LANs. Alternately or additionally, the network 512 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 512 may also include servers that enable one type of network to interface with another type of network.

In at least one embodiment, the server 502 may host a web-based visualization application ("application 514") that allows the client devices 504, 506, 508 and/or users thereof to generate, customize, and/or interact with visualizations as described herein. In other embodiments, the application 514 may include a non-web-based application but may generally be described herein as a web-based application for simplicity. Alternately or additionally, the server 502 may facilitate updates to the data sources 510 based on changes to the visualizations as described elsewhere herein.

The server 502 may additionally include a processor 516 and a storage medium 518.

The processor 516 may be of any type such as a central processing unit (CPU), a microprocessor (μP), a microcontroller (μC), a digital signal processor (DSP), or any combination thereof. The processor 516 may be configured to execute computer instructions that, when executed, cause the processor 516 to perform or control performance of one or more of the operations described herein with respect to the server 502.

The storage medium 518 may include volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 518 may store computer instructions that may be executed by the processor 516 to perform or control performance of one or more of the operations described herein with respect to the server 502.

The storage medium 518 may additionally store one or more data models 520 and/or data collections and/or visualization files 522. The data models 520 and/or data collections may each include or correspond to the data model 108 of FIG. 1, for example. In at least one embodiment, one data model 520 and/or data collections may be generated for each of the data sources 510. In at least one embodiment, one data model 520 and/or data collection may be generated for multiple data sources 510. In at least one embodiment, multiple data models 520 and/or data collections may be generated for a given one of the data sources 510. The generated data model(s) 520 and/or data collections may be persistently stored in the storage medium 518 and/or at least temporarily stored in volatile storage, e.g., in-memory.

The visualization files 522 may each include or correspond to the visualization file 400 of FIG. 4, for example. Each visualization file may generate a corresponding visualization, each visualization being a visualization of at least some data from a corresponding one of the data sources 510, which data from the data sources 510 may be available to the server 502 in a standardized format in the data models 520.

Source data at the data sources 510 may undergo changes over time. As such, the server 502 may from time to time update the data models 520 consistent with updates to the data sources 510. For example, the server 502 may include or be communicatively coupled to one or more ETL modules, such as the ETL modules 110, 112, 114 of FIG. 1 that perform an ETL process on the data sources 510 from time to time to generate and/or update the data models 520 on the server 502.

Alternatively or additionally, the server 502 may track changes made to graphical objects in a visualization and/or to graphical objects that represent the data objects and/or the graph objects in the visualization. The changes may be tracked in, e.g., a differential log of each of the visualization files 522, such as the differential log 408 of FIG. 4. A user may then be queried or otherwise prompted about whether to update the source data in view of the changes to the visualization that may implicate changes to the source data.

In some embodiments, the server 502 may be configured to cooperate with the client devices 504, 506, 508 to allow the client devices 504, 506, 508 to generate, customize, and/or interact with visualizations of at least some data of the data sources 510 and/or to update at least some data of the data sources 510 based on alterations to the visualizations. In these and other embodiments, client devices 504, 506, 508 may use a corresponding application or app, such as a browser 524, to generate the visualizations from the visualization files 522, which visualizations may be displayed on a display of the corresponding client devices 504, 506, 508.

Accordingly, each of the client devices 504, 506, 508 may execute an application, such as the browser 524, configured to communicate through the network 512 with the server 502. Each of the other client devices 519, 521 may be similarly configured to execute a browser, such as the browser 524. The browser 524 may include an Internet browser or other suitable application for communicating through the network 512 with the server 502. The browser 524 may generate, download and/or interact with visualizations and/or visualization files 522. Each of the client devices 504, 506, 508 may include a desktop computer, a laptop computer, a tablet computer, a mobile phone, a smartphone, a personal digital assistant (PDA), a wearable device (e.g., a smart watch), or another suitable client device.

Each of the client devices 504, 506, 508 may additionally include a processor and a storage medium, such as a processor 526 and a storage medium 528 as illustrated for the client device 504 in FIG. 5. Each of the other client devices 506, 508 may be similarly configured. Similar to the processor 516 of the server 502, the processor 526 may be of any type such as a CPU, a µP, a µC, a DSP, or any combination thereof. The processor 526 may be configured to execute computer instructions that, when executed, cause the processor 526 to perform or control performance of one or more of the operations described herein with respect to the client device 504 and/or the browser 524.

Similar to the storage medium 518 of the server 502, the storage medium 528 of the client device 504 may include volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 528 may store computer instructions that may be executed by the processor 526 to perform one or more of the operations described herein with respect to the client device 504 and/or the browser 524. The storage medium 528 may additionally store, at least temporarily, a visualization file 522 and/or other content or data obtained from the server 502 and/or created locally on the client device 504.

Embodiments described herein are not limited to using a browser to communicate with the server 502 to generate, customize, and/or interact with visualizations. For example, rather than or in addition to a browser, the client devices 504, 506, 508 may include a native app as are often used on client devices such as mobile devices including smartphones and tablet computers. Accordingly, embodiments described herein generally include generating, customizing, and/or interacting with visualizations using a browser, a native app, or another suitable application on the client devices 504, 506, 508.

Figure 6:
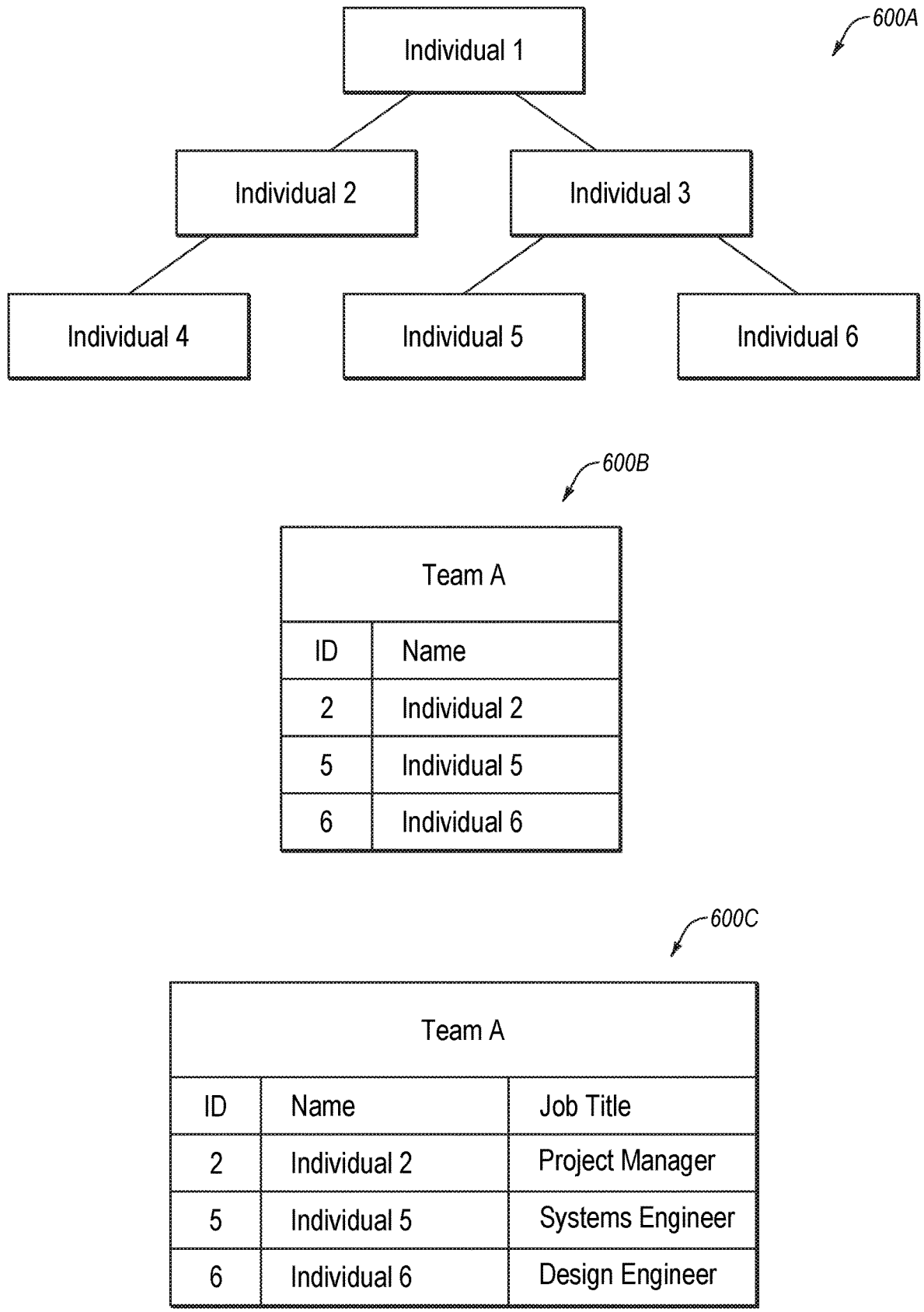
FIG. 6 illustrates example data collections generated from data of a data source from which a visualization may be generated.

FIG. 6 illustrates example data collections 600A, 600B, 600C (collectively "data collections 600") generated from data of a data source, arranged in accordance with at least one embodiment described herein. The data collections 600 may be used to, e.g., generate visualizations as described elsewhere in the present disclosure.

The data collection 600A may include graph data of an organization. The data collection 600A may include various nodes and edges. The nodes may include, e.g., employee IDs, First Names, Last Names, Job Titles, Team designations, and/or any other appropriate information for one or more employees of an organization. For example, the data collection 600A may include the First Names and the Last Names of the nodes of the data collection 600A labeled as Individual 1, Individual 2, Individual 3, Individual 4, Individual 5, and Individual 6. The edges may include relationships between nodes. For example, the data collection 600A may include hierarchical relationships between the nodes. In some embodiments, the edges may be based on a single piece of data in the data source. In other embodiments, the edges may be based on multiple pieces of data in the data source. As an example, the data in the data source may include a comma separated list including teams and an individual (e.g., a single piece of data in the data source) that belongs to the teams. Multiple edges may be generated based on the list of the teams and the individual since the list of the teams and the individual may indicate a relationship between the individual and each of the teams included in the list. As another example, the data in the data source may include multiple containers (e.g., container A and container B) and may indicate that each item in the containers is related to each other (e.g., each item in container A is related to each item in container B). Multiple edges may be generated between each of the items in the containers based on this data of the data source (e.g., an edge may be generated between each item in container A and each item in container B).

In some embodiments, the data collection 600A may include graph data generated from data of a data source, e.g., an HR database. In other embodiments, the data collection 600A may include graph data obtained from a user. As illustrated in FIG. 6, the data collection 600A may include multiple nodes, represented in the data collection 600A as Individual 1, Individual 2, Individual 3, Individual 4, Individual 5, and Individual 6. Likewise, the data collection 600A may include multiple edges indicating relationships between two nodes in the data collection 600A. For example, edges may indicate a relationship between Individual 1 and Individual 2 and between Individual 1 and Individual 3. A format of the data collection 600A may include an in-memory graph, graph description language (DOT) (e.g., Graphviz file type), JSON that is structured to include graphs, Graph Markup Language (GraphML), CSV, or any other appropriate format.

The data collection 600A may include graph data in a standardized format. In some embodiments, the data collection 600A may be generated by converting at least a portion of the data of the data source from a non-standardized graph format to the standardized graph format as discussed elsewhere in the present disclosure. In these and other embodiments, the data collection 600A may be generated by converting at least a portion of the data of the data source from a tabular format to the standardized graph format.

The data collection 600B may include tabular data of an organization which may be the same as or different from the organization of the data collection 600A. Accordingly, the data collection 600B may also include employee IDs, First Names, Last Names, Job Titles, Team designations, and/or any other appropriate information for one or more employees of an organization. For example, the data collection 600B in the tabular format is illustrated as including the employee IDs and employee names for the members of Team A (e.g., Individual 2, Individual 5, and Individual 6). The data collection 600B may include tabular data taken directly or derived from the data source, e.g., a spreadsheet that identifies at least each employee's ID and name that is on Team A.

The data collection 600C may include other tabular data of an organization which may be the same as or different from the organization(s) of the data collection(s) 600A and/or 600B. The data collection 600C may also include employee IDs, First Names, Last Names, Job Titles, Team designations, and/or any other appropriate information for one or more employees of an organization. For example, the data collection 600C in the tabular format is illustrated as including employee IDs, employee names, and Job Titles for the members of Team A (e.g., Individual 2, Individual 5, and Individual 6). The data collection 600C may include tabular data taken directly or derived from the data source, e.g., a spreadsheet that identifies at least each employee's ID, name, and title that is on Team A.

As illustrated in FIG. 6, in some embodiments, the data collections 600A, 600B, 600C may include data from the data source in the standardized graph format (e.g., data collection 600A) and/or in a standardized tabular format (e.g., data collections 600B and 600C).

Figure 7:
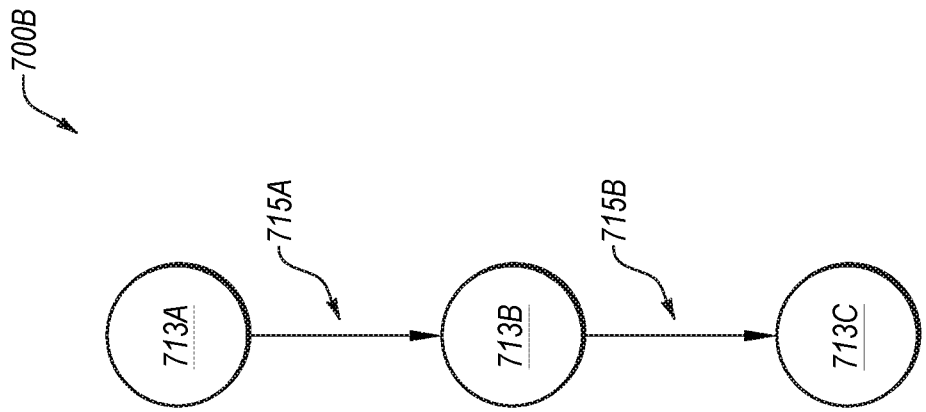
FIG. 7 illustrates example graph data that may be obtained from a data source or generated based on data of the data source.
Figure 7:
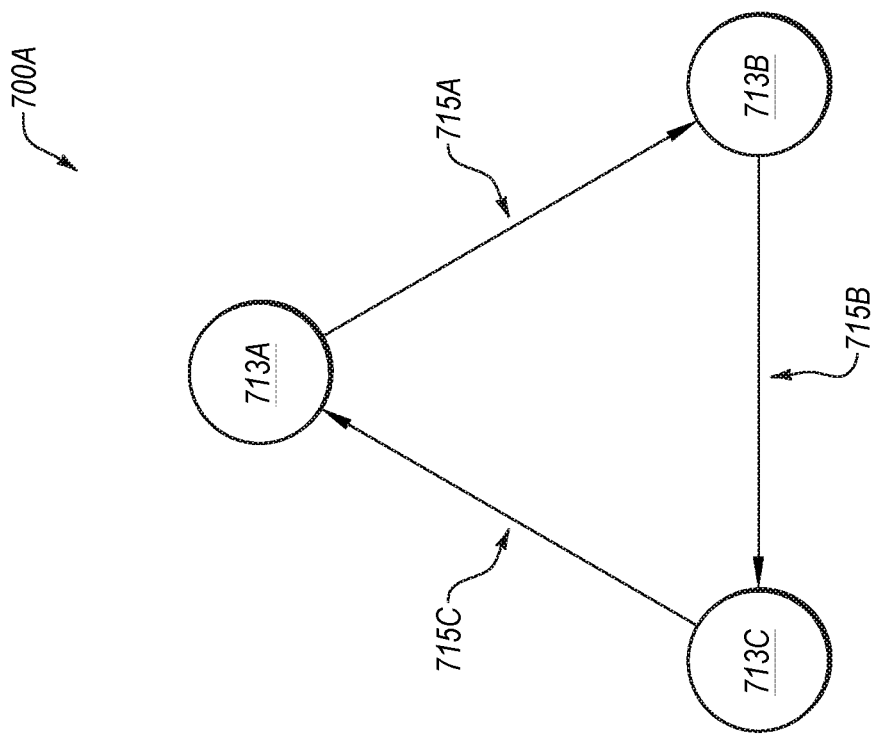

FIG. 7 illustrates example graph data 700A and 700B (hereinafter collectively "graph data 700") that may be obtained from a data source or generated based on data of the data source, arranged in accordance with at least some embodiments described herein. FIG. 7 illustrates the graph data 700 as first graph data 700A and second graph data 700B. In some embodiments, at least a portion of the graph data 700 may be generated based on tabular data included in the data of the data source. The graph data 700 may include multiple nodes 713A, 713B, 713C (hereinafter collectively "nodes 713") and multiple edges 715A, 715B, 715C (hereinafter collectively "edges 715"). The nodes 713 may represent parts of a whole and the edges 715 may indicate relationships between two of the nodes 713.

The first graph data 700A is illustrated as including a loop (e.g., the edges 715 connect node 713A to itself). In some embodiments, the first graph data 700A may not be compatible with visualizations because of the loop. The second graph data 700B is illustrated as not including the loop. The second graph data 700B may include a transformed version of the first graph data 700A. The second graph data 700B may have been transformed to remove edge 715C to eliminate the loop.

In some embodiments, the graph data 700 may only represent data of a data source. In other embodiments, the graph data 700 may only represent data that was obtained from a user. For example, data search results may return data in a graph format and the user may provide the data search results in the graph format. Alternatively or additionally, the graph data 700 may represent a combination of data of a data source and data that was obtained from a user.

The graph data 700 illustrated in FIG. 7 is provided as example graph data 700. The graph data 700 and/or other suitable graph data may be used to generate visualizations having any suitable visualization type, such as organizational chart (e.g., hierarchical organizational chart, matrix organizational chart, flat organizational chart), container, mind map, abstraction layer, logical network diagram, flowchart, supply chain process map, concept map, swim lane charts, or other suitable visualization type.

Figure 8:
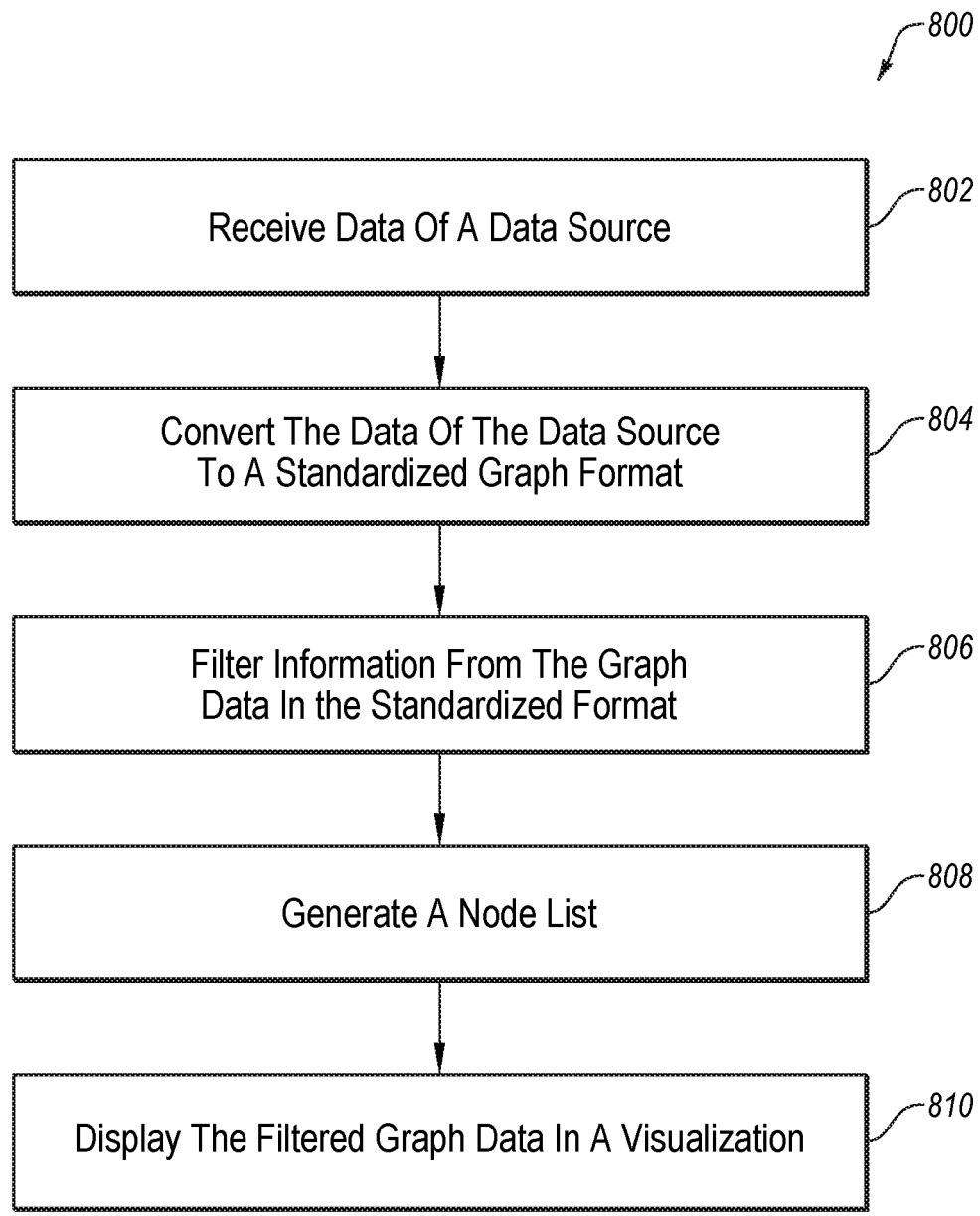
FIG. 8 is a flowchart of a method to display filtered graph data in a visualization.

FIG. 8 is a flowchart of a method to display filtered graph data in a visualization, arranged in accordance with at least one embodiment described herein. The method 800 may be programmably performed or controlled by a processor in, e.g., a computer and/or server that executes a browser, visualization application, and/or other application to generate visualizations based on contracts and/or graph data. In an example implementation, the method 800 may be performed in whole or in part by the server 502 and/or the client device 504 of FIG. 5. The method 800 may include one or more of blocks 802, 804, 806, 808, and/or 810. The method 800 may begin at block 802.

At block 802 ("Receive Data Of A Data Source"), data of a data source may be received. The data of the data source may include graph data in a graph format, tabular data in a tabular format, or some combination thereof. The data source may include, e.g., any of the data sources 102, 104, 106, 510 or other data sources described herein. The data may be obtained from a data source, a user, or some combination thereof. Block 802 may be followed by block 804.

At block 804 ("Convert The Data Of The Data Source To A Standardized Graph Format"), the data of the data source may be converted to a standardized graph format. For example, the tabular data in the data of the data source may be converted to graph data in the standardized graph format. As another example, the graph data in the non-standardized graph format may be converted to graph data in the standardized format (e.g., formatting issues such as loops may be removed). In some embodiments, the converted data of the data source in the standardized graph format may be called a derived graph and/or an in memory graph.

Alternatively, the data of the data source may only include graph data in the standardized graph format and block 804 may be omitted.

In some embodiments, converting the data of the data source to the graph format may include performing one or more transformations of the data of the data source. In these and other embodiments, the transformations of the data of the data source may be based on which visualization type is to be used for generating a visualization. The visualization may be associated with a corresponding contract (e.g., a graph contract). Various example visualization types from which the visualization type may be selected are described, e.g., with respect to FIG. 2. The contract may include, e.g., any of the contracts 120, 122, 124, 300, 402 or other contracts described herein.

For example, the data of the data source may include cycles or multiple parents of single nodes and the standardized graph format may be a tree format (e.g., a contract may indicate that the data of the data source is to be in a tree format). One or more edges and/or nodes may be removed from the data of the data source to remove the cycles and the multiple parents of the single nodes to cause the data of the data source to be in the standardized graph format. As another example, the data of the data source may include multiple root nodes and the standardized graph format may be a single tree format. An additional root node (e.g., a higher-level root node) with edges connecting the additional root node to each of the root nodes may be added to the data of the data source to cause the data of the data source to be in a single tree format (e.g., the standardized graph format). As yet another example, at least a portion of the data of the data source may not include a category field and the standardized graph format may indicate that all of the data of the data source that is to be included in the visualization is to include a category field. Category fields may be added to the at least the portion of the data of the data source that does not include category fields. In some embodiments, the added category fields may be labelled "uncategorized items".

The corresponding contract may include a schema that specifies a set of data fields and one or more relationships between the data fields that at least a portion of the data of the data source is to be mapped to such that the corresponding contract will be satisfied. In some embodiments, the corresponding contract may specify that the data of the data source is to be graph data in the standardized graph format (or more generally, a particular graph format) for mapping graph objects to the data fields. In these and other embodiments, the corresponding contract may specify graph constraints for the visualization. The graph constraints may include node structure, edge structure, and/or structural constraints of the visualization. For example, the absence of loops may be a structural constraint imposed on the graph data. The data of the data source may be converted (e.g., transformed) to meet the graph constraints specified in the corresponding contract.

The node structure may indicate what information is to be included or obtained for each node in the visualization. The edge structure may indicate what type of relationships between nodes may be displayed in the visualization. In addition, in some embodiments, the edge structure may indicate a number of edges that may connect to each node. Further, the structural constraints may indicate limitations on a layout of the visualization. In some embodiments, the structural constraints may indicate that the graph data and/or corresponding visualization is not to include loops. For example, the graph data that includes a loop may be transformed to a tree graph format and one or more edges that are part of the loop may be deleted or otherwise removed. As another example, the structural constraints may indicate what type of nodes may be positioned beneath other types of nodes in the visualization (e.g., type A nodes are to be beneath type B nodes).

As an example, with reference to FIG. 7, as discussed above, the first graph data 700A may include a loop connecting node 713A to itself. The contract associated with the visualization may specify that data of the data source is to be in a tree format (e.g., no loops are to be included in the graph data). Accordingly, the edge 715C may be deleted or otherwise removed from the first graph data 700A to obtain the second graph data 700B. Referring back to FIG. 8, as another example, the corresponding contract may indicate that an Org chart visualization is to include nodes representing each manager in a company, edges representative of a reporting hierarchy for each manager, and that no loops are to be included in the visualization.

For example, with reference to FIG. 6A, the corresponding contract associated with the data collection 600A may specify that the node labeled as Individual 1 is to be representative of a Chief Executive Officer (CEO), the node labeled Individual 2 is to be representative of a Chief Technology Officer (CTO), and that the node labeled as Individual 3 is to be representative of a Chief Financial Officer (CFO) of the company. In addition, the contract associated with the data collection 600A may indicate that each node is to include the First Name, the Last Name, and the Job Title of the employee represented by the corresponding node. Returning to FIG. 8, the graph objects of the graph data in the standardized graph format may be mapped to the corresponding contract such that the corresponding contract is satisfied. The mapping may be performed by or using a corresponding contract map, such as, e.g., any of the contract maps 304, 306, 404 or other contract maps described herein.

In some embodiments, the visualization type may be associated with multiple contracts. One or more of the contracts associated with the visualization type may indicate that a portion of the corresponding data of the data source is to be in a standardized tabular format. Likewise, one or more of the contracts associated with the visualization type may indicate that another portion of the corresponding data of the data source is to be in the standardized graph format. In these and other embodiments, a portion of the data of the data source may be converted to or left in the standardized graph format and another portion of the data of the data source may be converted to the standardized tabular format. Additionally or alternatively, a portion of the data may be converted from a graph format to the standardized tabular format.

In some embodiments, each of the contracts associated with the visualization type may indicate data fields that are to be populated to satisfy the contracts using either data objects or graph objects of the data of the data source. For example, a first contract associated with the visualization type may indicate data fields that are to be populated using data objects of the data of the data source in the standardized tabular format and a second contract associated with the visualization type may indicate data fields that are to be populated using graph objects of the data of the data source in the standardized graph format. For example, the contracts may indicate that the visualization is to include a photo URL and edges representative of reporting hierarchy for each employee included in the visualization as graphical objects based on at least a portion of graph objects in the data of the data source and the Job Title, First Name, Last Name, and Annual Salary for each employee included in the visualization as graphical objects based on at least a portion of tabular objects in the data of the data of the data source. Optionally, the method 800 may further include generating a visualization following block 804 based on the data of the data source in the standardized graph format. Alternatively or additionally, block 804 may be followed by block 806.

At block 806 ("Filter Information From The Graph Data In The Standardized Graph Format"), information may be filtered from the graph data in the standardized graph format. In some embodiments, the information may be filtered from the graph data based on input effective to filter information. In these and other embodiments, filtering the information from the graph data may filter the data of the data source that is included in the visualization. Thus, the visualization may be updated to reflect the results of the filtering at block 806.

In some embodiments, a user may select a filtering option included in a menu in a user interface for filtering the information in the graph data to modify the data of the data source included in the visualization. In these and other embodiments, the filtering of the information from the graph data may be performed based on the relationships indicated by the edges in the visualization. For example, the user may select to display only related nodes of a particular node in the visualization (e.g., to display ancestors of a particular node in the visualization). The graph data may be filtered to only include data that is related to the particular node in the visualization by determining if an edge connects the particular node to each of the other nodes in the graph data.

As an example, graph data of an organization may be filtered to only include nodes representative of employees that directly or transitively report to a particular manager. For instance, the filter may be applied to the graph data to identify all nodes that have a node corresponding to the particular manager as an ancestor. In some embodiments, if the filtering occurs after the visualization has been displayed, the visualization of the graph data may be updated in response to the filtering to show, e.g., graphical objects corresponding to the employees that directly or transitively report to the particular manager. As another example, the graph data of the organization may be filtered to only include nodes representative of employees that directly or transitively report to the particular manager. Block 806 may be followed by block 808.

At block 808 ("Generate A Node List"), a node list may be generated. A node list operation may be applied to the filtered graph data to output, e.g., a team assignment of every employee that reports to the particular manager. In some embodiments, the node list may be generated based on the derived graph (e.g., the converted data of the data source in the standardized graph format) and any filters that have been applied to the derived graph. In these and other embodiments, the node list may include each node from the derived graph that matches the filter. In some embodiments, a list of nodes in a tabular format may be generated to include nodes from the filtered data. Alternatively, the graph data may not be filtered or may be in a format that is compatible with the visualization and block 804 may be omitted. Block 808 may be followed by block 810.

At block 810 ("Display The Filtered Graph Data In A Visualization"), the filtered graph data may be displayed in the (updated) visualization. For example, one or more container visualizations where each container corresponds to a different team and includes all of the employees on the corresponding team that report to the particular manager may be outputted. In some embodiments, the visualization may be generated based on the node list.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Alternatively or additionally, the method 800 may further include, receiving input effective to gather information via a user interface displaying the visualization. For example, the input may indicate that the user wants to know how many employees in the visualization report to a particular manager. The number of nodes that represent employees that report to the particular manager may be determined by counting the number of nodes that are related to the node representing the particular manager using the edges in the visualization.

In addition, the method 800 may further include, receiving input effective to alter the visualization. For example, the input may alter the relationship between nodes. With reference to FIG. 6, the input may alter the relationship between the nodes labeled as Individual 1 and Individual 2 in the data collection 600A to create a modified visualization. Likewise, the graph data may include or embody a forward and a backward transformation rule. As such, the graph data may effectively permit alterations to the visualization to be written back to the data of the data source. For example, the alteration to the relationship between the nodes labeled as Individual 1 and Individual 2 in the data collection 600A may be written back to the graph data and to the data of the data source such that the graph data and the data of the data source include the altered relationship. Returning to FIG. 8, alterations to the visualization may be propagated to the data of the data source as discussed elsewhere in the present disclosure. In some embodiment, alterations to the visualization may be propagated to data of the data source that may not be displayed because of filtering options that may have been selected.

Alternatively or additionally, the method 800 may be combined, in whole or in part, with one or more of the other methods described herein, or with one or more portions of one or more of the other methods described herein. For example, the method 800 may be combined with method 1000 or 1100 of FIGS. 10 and 11.

Figure 9:
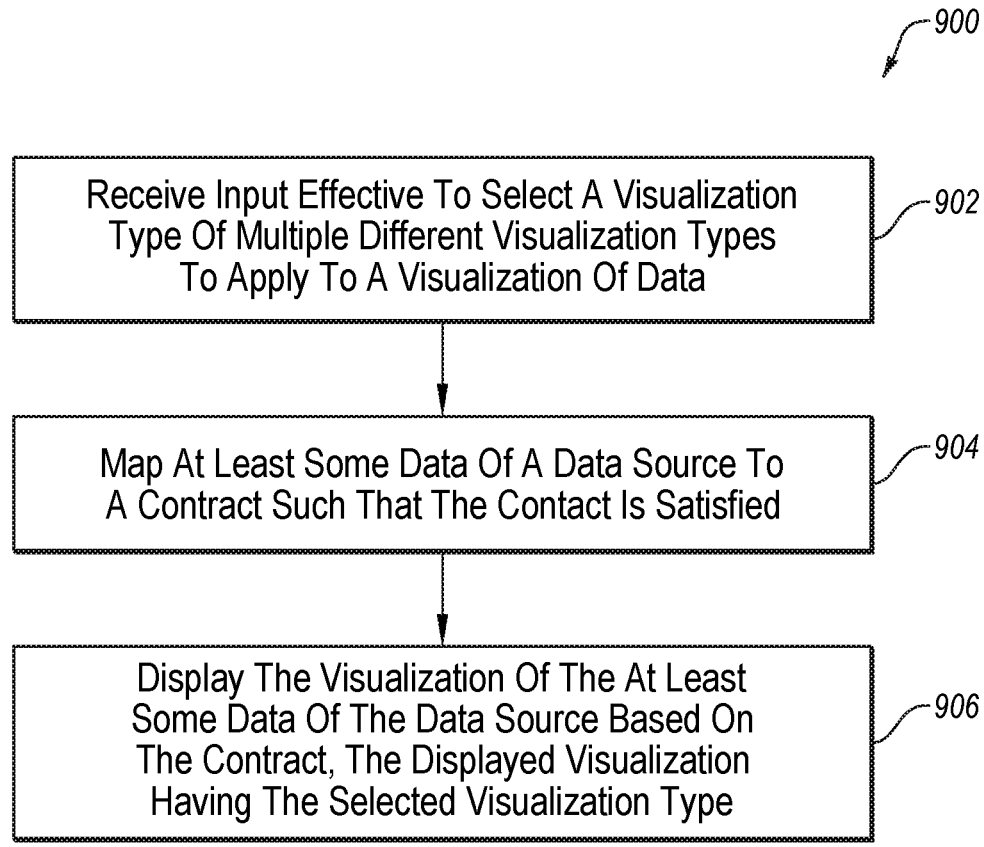
FIG. 9 is a flowchart of a method to generate a visualization of data from a data source based on a contract.

FIG. 9 is a flowchart of a method 900 to generate a visualization of data from a data source based on a contract, arranged in accordance with at least one embodiment described herein. The method 900 may be programmably performed or controlled by a processor in, e.g., a computer and/or server that executes a browser, visualization application, and/or other application to generate visualizations based on contracts. In an example implementation, the method 900 may be performed in whole or in part by the server 502 and/or the client device 504 of FIG. 5. The method 900 may include one or more of blocks 902, 904, and/or 906. The method 900 may begin at block 902.

At block 902 ("Receive Input Effective To Select A Visualization Type Of Multiple Different Visualization Types To Apply To A Visualization Of Data"), input may be received that is effective to select a visualization type of multiple different visualization types to apply to a visualization of data. Various example visualization types from which the visualization type may be selected are described, e.g., with respect to FIG. 2. Receiving the input may include receiving user input. For example, a user may select a specific visualization and/or a specific visualization type from a drop-down menu in a user interface. The selected visualization type may be associated with a contract. Each of the different visualization types may be associated with a corresponding specific contract of multiple contracts. Each contract may include a corresponding schema that specifies a set of data fields and one or more relationships between data fields in the set to generate and display a corresponding visualization having a corresponding visualization type. Block 902 may be followed by block 904.

At block 904 ("Map At Least Some Data Of A Data Source To A Contract Such That The Contract Is Satisfied"), at least some data of a data source may be mapped to a contract such that the contract is satisfied. In some embodiments, the contract may specify that the data of the data source be in a graph format. In other embodiments, the contract may specify that a portion of the data of the data source be in the graph format and another portion of the data of the data source be in a tabular format. The data source may include, e.g., any of the data sources 102, 104, 106, 510 or other data sources described herein. The contract may include, e.g., any of the contracts 120, 122, 124, 300, 402 or other contracts described herein. The mapping may be performed by or using a corresponding contract map, such as, e.g., any of the contract maps 304, 306, 404 or other contract maps described herein. In at least one embodiment, at least some data of the data source may not have at the data source a schema or shape that matches the corresponding schema or shape of the contract until the at least some data of the data source is mapped to the contract.

Mapping at least some data of the data source to the contract at block 904 may include identifying multiple specific data from multiple different data collections extracted from the data source. At least some of the specific data may satisfy a first data field of the set of data fields specified by the schema of the contract and at least some other data of the specific data may satisfy a second data field of the set of data fields specified by the schema of the contract. When combined, the multiple specific data from the multiple different data collections may form a set of data having a structure necessary to produce the visualization with the selected visualization type.

Alternatively or additionally, mapping at least some data of the data source to the contract at block 904 may include identifying at least first data from a first data collection extracted from the data source and second data from a second data collection extracted from the data source. The first data may satisfy a first data field of the set of data fields specified by the schema of the contract and the second data may satisfy a second data field of the set of data fields specified by the schema of the contract. When combined, the first data and the second data may form at least a part of a set of data having a structure necessary to produce the visualization with the selected visualization type. Block 904 may be followed by block 906.

At block 906 ("Display The Visualization Of The At Least Some Data Of The Data Source Based On The Contract, The Displayed Visualization Having The Selected Visualization Type"), the visualization of the at least some data of the data source is displayed based on the contract, where the displayed visualization has the selected visualization type. Displaying the visualization of the at least some data based on the contract may include displaying graphical objects representing data objects and/or graph objects of the data source to reflect relationships specified by the contract.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 900 may be combined with one or more other methods and processes described herein.

Alternatively or additionally, the method 900 may further include, in response to an update at the data source resulting in an alteration of a portion of the at least some data of the data source, updating the visualization to reflect the alteration. For example, if the visualization is a logical network diagram that includes, among other devices, components, and/or connections, a server that is renamed at the data source such that the server has a new name, the visualization may be updated to include the server's new name. As another example, if the visualization is an organizational chart that includes various employees of an organization, and one of the employees is, e.g., deleted from the data source or updated at the data source to have a status of former employee in response to the employee leaving the organization, the organizational chart may be updated to omit the former employee from the organizational chart.

In at least one embodiment, the method 900 may further include, prior to displaying the visualization, generating a semantic layout of the visualization based on the contract associated with the selected visualization type. The semantic layout may specify one or more of relative locations, arrangement, and relationships of multiple data objects to represent in the visualization.

In at least one embodiment, the selected visualization type may include a first selected visualization type, the visualization may include a first visualization, the contract may include a first contract, and the at least some data of the data source may include a first portion of the data of the data source. In this and other embodiments, the method 900 may further include receiving input effective to select a second visualization type of the multiple different visualization types to apply to a second visualization of the data from the data source. The second selected visualization type may be associated with a second contract of the multiple contracts, where the second contract is different than the first contract. The method 900 may also include mapping a second portion of the data of the data source to the second contract such that the second contract is satisfied. And displaying the second visualization of the second portion of the data of the data source. The displayed second visualization may have the second selected visualization type that is different than the first selected visualization type.

In at least one embodiment, the selected visualization type may include a first selected visualization type and the visualization may include a first visualization. In this and other embodiments, the method 900 may further include receiving input effective to select a second visualization type of the multiple different visualization types to apply to a second visualization of the data from the data source. The second selected visualization type may be associated with the same contract as the first selected visualization type. The method 900 may also include displaying the second visualization of the at least some data of the data source. The displayed second visualization may have the second selected visualization type that is different than the first selected visualization type.

Alternatively or additionally, the method 900 may further include, prior to the mapping at block 904, translating the data of the data source from a first format to a standardized format. Translating the data to the standardized format may include translating the data to normalized tabular data.

Some or all of the functions or blocks described in this and other processes and methods may be implemented by one or more processors executing computer-readable instructions stored on one or more non-transitory computer-readable media. Execution by the processor(s) of the computer-readable instructions may cause the processor(s) to perform or control performance of the functions or blocks. The one or more processors may include the processor 516 of the server 502 of FIG. 5, the processor 526 of the client device 504, and/or one or more other processors of one or more other devices. The non-transitory computer-readable media may include one or more non-transitory computer-readable media included in or accessible to the foregoing computer or server, such as the storage medium 518 of the server 502, the storage medium 528 of the client device 504, and/or one or more other storage media of one or more other devices. The computer-readable instructions may include one or more of the application 514 of the server 502, the browser 524 of the client device 504, and/or one or more other applications of one or more other devices.

Figure 10:
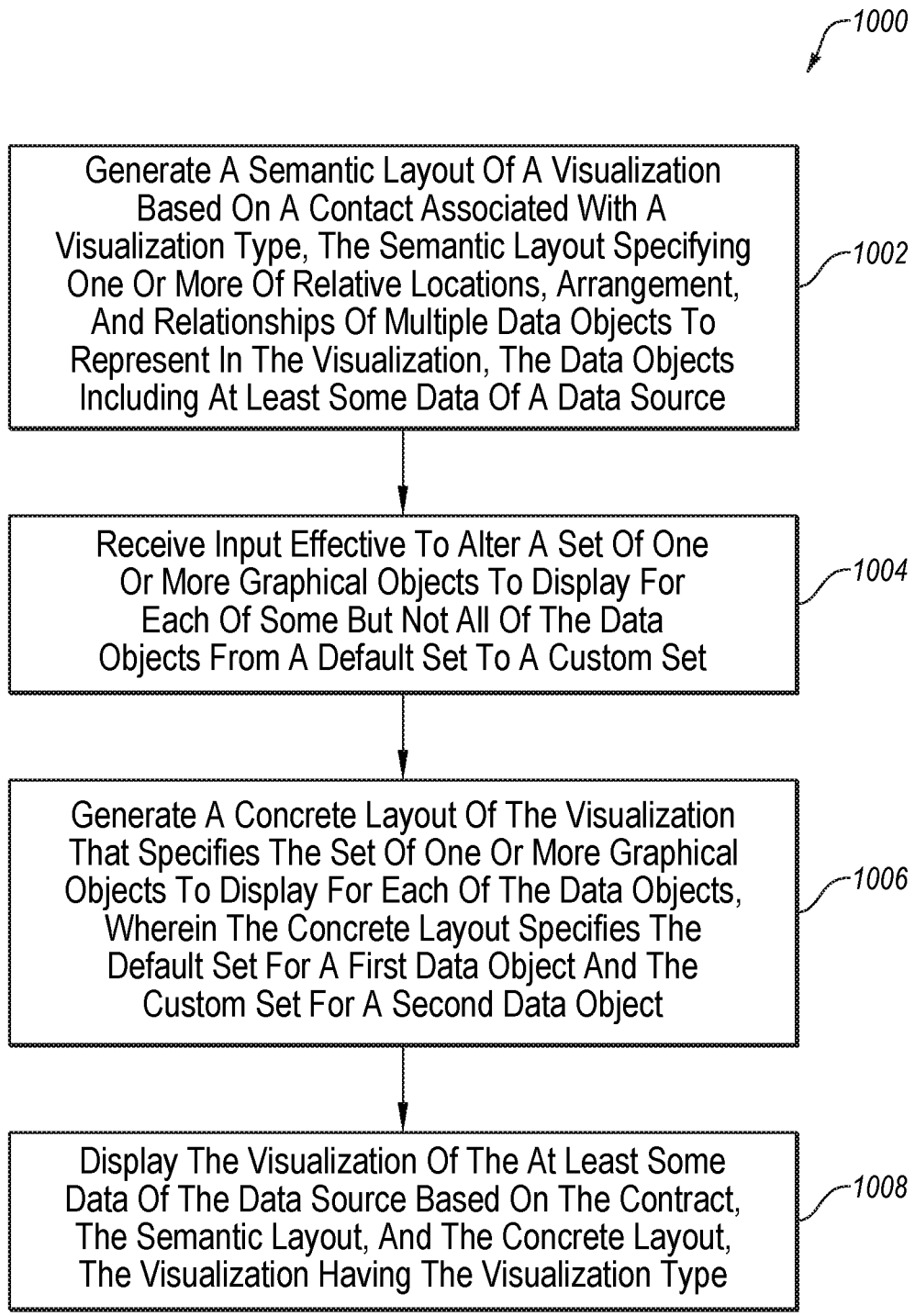
FIG. 10 is a flowchart of a method to customize a visualization of data from a data source based on a contract.

FIG. 10 is a flowchart of a method 1000 to customize a visualization of data from a data source based on a contract, arranged in accordance with at least one embodiment described herein. The method 1000 may be programmably performed or controlled by a processor in, e.g., a computer and/or server that executes a browser, visualization application, and/or other application to customize visualizations. In an example implementation, the method 1000 may be performed in whole or in part by the server 502 and/or the client device 504 of FIG. 5. The method 1000 may include one or more of blocks 1002, 1004, 1006, and/or 1008. The method 1000 may begin at block 1102.

At block 1002 ("Generate A Semantic Layout Of A Visualization Based On A Contract Associated With A Visualization Type, The Semantic Layout Specifying One Or More Of Relative Locations, Arrangement, And Relationships Of Multiple Data Objects To Represent In The Visualization, The Data Objects Including At Least Some Data Of A Data Source"), a semantic layout of a visualization may be generated based on a contract. The contract may be associated with a visualization type. The semantic layout may specify one or more of relative locations, arrangements, and relationships of multiple data objects and/or graph objects in data of a data source to represent in the visualization. Additionally or alternatively, the semantic layout may specify one or more relative locations, arrangements, and relationships of multiple graph objects to represent in the visualization. The data objects and/or the graph objects may include at least some data of the data source. Block 1002 may be followed by block 1004.

At block 1004 ("Receive Input Effective To Alter A Set Of One Or More Graphical Objects To Display For Each Of Some But Not All Of The Data Objects From A Default Set To A Custom Set"), input may be received that is effective to alter a set of one or more graphical objects to display for each of some but not all of the data objects or graph objects from a default set of one or more graphical objects to a custom set of one or more graphical objects. The input may be effective to alter the set of one or more graphical objects in the visualization. Receiving the input may include receiving input from a user effective to specify the customization. Block 1004 may be followed by block 1006.

At block 1006 ("Generate A Concrete Layout Of The Visualization That Specifies The Set Of One Or More Graphical Objects To Display For Each Of The Data Objects, Wherein The Concrete Layout Specifies The Default Set For A First Data Object And The Custom Set For A Second Data Object"), a concrete layout of the visualization may be generated. The concrete layout may specify the set of one or more graphical objects in the visualization to display for each of the multiple data objects and/or graph objects in the data of the data source. In particular, the concrete layout may specify the default set for a first data object of the multiple data objects or a first graph object of multiple graph objects in the data of the data source and the custom set for a second data object of the multiple data objects or a second graph object of the multiple graph objects in the data of the data source. Additionally or alternatively, the concrete layout may specify the set of one or more graphical objects to display in the visualization for each of the multiple graph objects in the visualization. In particular, the concrete layout may specify the default set for a first graph object of the multiple graph objects to display in the visualization and the custom set for a second graph object of the multiple graph objects to display in the visualization. Block 1006 may be followed by block 1008.

At block 1008 ("Display The Visualization Of The At Least Some Data Of The Data Source Based On The Contract, The Semantic Layout, And The Concrete Layout, The Visualization Having The Visualization Type"), the visualization of the at least some data of the data source may be displayed based on the contract, the semantic layout, and the concrete layout. The visualization may have the visualization type associated with the contract.

By way of example, receiving the input at block 1004 may include receiving a selection by a user of one of the graphical objects displayed for a data object or a graph object in the data source and receiving an alteration by the user of some aspect of the graphical object in the visualization. Alternatively or additionally, receiving the input at block 1004 may include receiving data object-specific formatting and/or graph object-specific formatting input that specifies the custom set to display for the second data object or the second graph object. For example, the user may input data object-specific formatting or graph object-specific formatting by altering one or more of the graphical objects displayed in the visualization for the second data object or the second graph object. In these and other embodiments, displaying the visualization may include displaying the custom set for the second data object or the second graph object and displaying the default set for the first data object or the first graph object. Alternatively or additionally, the method 1000 may further include, in response to an update at the data source that alters the second data object or the second graph object, updating the visualization to reflect the alteration while maintaining the custom set for the second data object or the second graph object.

As another example, receiving the input at block 1004 may include receiving a conditional customization rule created by the user that customizes one or more graphical objects displayed for any of the data objects and/or graph objects in the data source that satisfy a predetermined condition specified in the conditional customization rule. In more detail, receiving the input at block 1004 may include receiving conditional customization input (e.g., a conditional customization rule created by a user) that specifies a predetermined custom set of one or more graphical objects to display for each data object of a subset of the multiple data objects and/or each graph object of a subset of the multiple graph objects in the data of the data source, where each data object of the subset and/or graph object of the subset satisfies a predetermined condition specified by the conditional customization input. The second data object or the second graph object may be included in the subset that satisfies the predetermined condition.

In this and other embodiments, displaying the visualization at block 1008 may include displaying the predetermined custom set for each data object or graph object—including the second data object or the second graph object—of the subset that each satisfies the predetermined condition. Displaying the visualization may also include displaying the default set for each data object of another subset of the multiple data objects or each graph object of another subset of the multiple graph objects, where the other subset includes the first data object, the first graph object, each data object of the other subset fails to satisfy the predetermined condition, and each graph object of the other subset that fails to satisfy the predetermined condition. As a particular example, the multiple data objects or multiple graph objects may include employees of an organization and the predetermined condition may include having a job at or above a predetermined level of the organization. In this and other embodiments, displaying the visualization at block 1008 may include displaying a hierarchical organizational chart (e.g., a visualization with a hierarchical organizational chart visualization type). Displaying the hierarchical organizational chart may include displaying the default set for each of the employees below the predetermined level of the organization and displaying the predetermined custom set for each of the employees at or above the predetermined level of the organization.

In at least one embodiment, the method 1000 may further include changing the graphical objects displayed for a data object or a graph object that initially satisfies the predetermined condition from the predetermined custom set back to the default set in response to the data object or the graph object being changed at the data source such that it no longer satisfies the predetermined condition. For example, in response to an update at the data source that alters the second data object or the second graph object to no longer satisfy the predetermined condition, the method 1000 may further include updating the visualization to reflect the alteration. Alternatively or additionally, the semantic layout and/or the concrete layout may be updated prior to updating the visualization. Updating the visualization may include changing a display of a set of one or more graphical objects for the second data object or the second graph object from the predetermined custom set to the default set.

Alternatively or additionally, the method 1000 may be combined, in whole or in part, with one or more of the other methods described herein, or with one or more portions of one or more of the other methods described herein. For example, the method 1000 may further include, prior to displaying the visualization, receiving input effective to select the visualization type of multiple different visualization types to apply to the visualization and mapping at least some data of the data source to the contract such that the contract is satisfied. As another example, the method 1000 may further include receiving input effective to alter a third graphical object of the multiple graphical objects of the visualization, the alteration implicating a change to a third data object and/or the third graph object of the at least some data of the data source; and altering the third data object and/or the third graph object at the data source consistent with the alteration to the third graphical object of the visualization.

Figure 11:
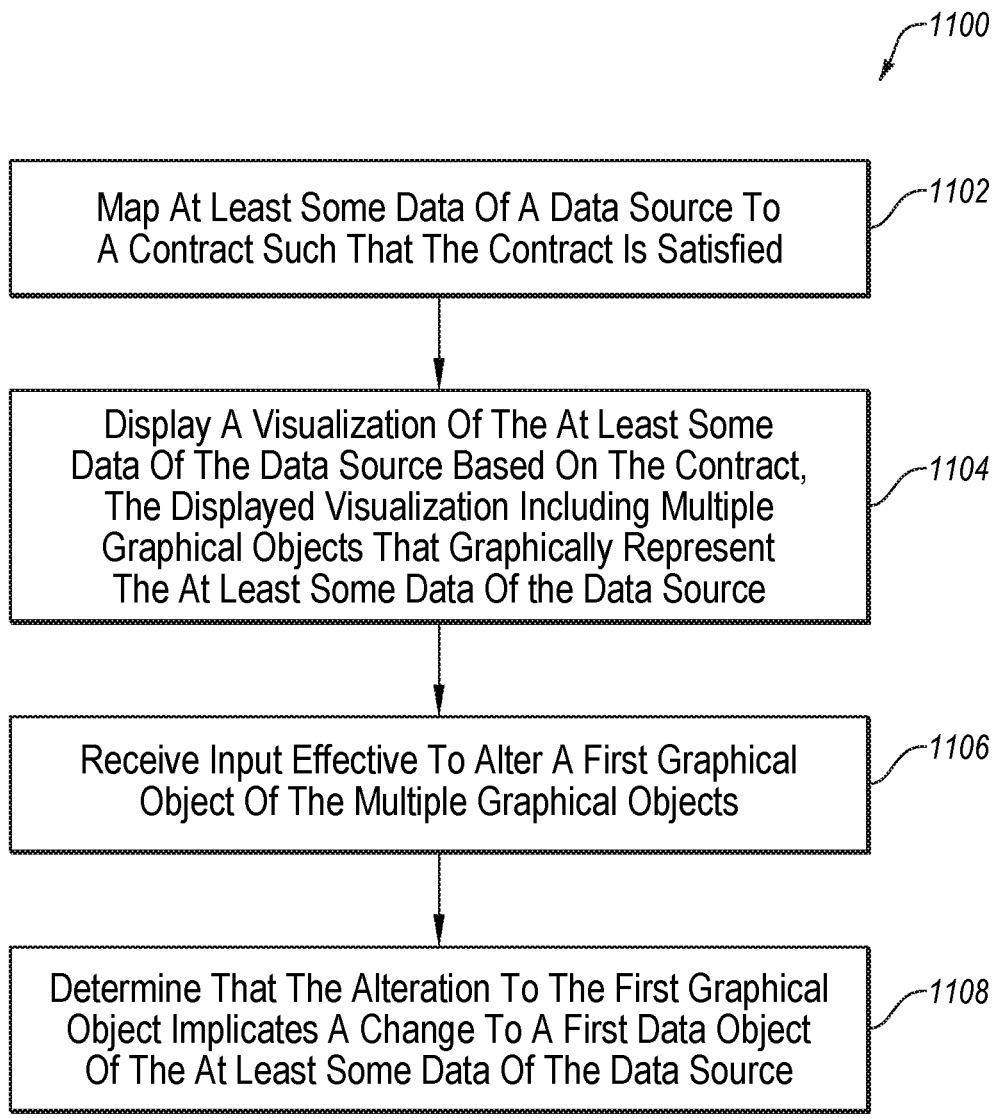
FIG. 11 is a flowchart of a method to interact with a visualization of data from a data source based on a contract.

FIG. 11 is a flowchart of a method 1100 to interact with a visualization of data from a data source based on a contract, arranged in accordance with at least one embodiment described herein. The method 1100 may be programmably performed or controlled by a processor in, e.g., a computer and/or server that executes a browser, visualization application, and/or other application to customize visualizations. In an example implementation, the method 1100 may be performed in whole or in part by the server 502 and/or the client device 504 of FIG. 5. The method 1100 may include one or more of blocks 1102, 1104, 1106, and/or 1108. The method 1100 may begin at block 1102.

At block 1102 ("Map At Least Some Data Of A Data Source To A Contract Such That The Contract Is Satisfied"), at least some data of a data source may be mapped to a contract such that the contract is satisfied. In some embodiments, the contract may specify that the data of the data source be in a graph format. In other embodiments, the contract may specify that a first portion of the data of the data source be in a graph format and a second portion be in a tabular format. The data source may include, e.g., any of the data sources 102, 104, 106, 510 or other data sources described herein. The contract may include, e.g., any of the contracts 120, 122, 124, 300, 402 or other contracts described herein. The mapping may be performed by or using a corresponding contract map, such as, e.g., any of the contract maps 304, 306, 404 or other contract maps described herein. In at least one embodiment, at least some data of the data source may not have at the data source a schema or shape that matches the corresponding schema or shape of the contract until the at least some data of the data source is mapped to the contract. Mapping at least some data of the data source to the contract at block 1104 may include identifying multiple specific data from multiple different data collections extracted from the data source. When combined, the multiple specific data from the multiple different data collections may form a set of data having a structure necessary to produce a visualization. Block 1102 may be followed by block 1104.

At block 1104 ("Display A Visualization Of The At Least Some Data Of The Data H Source Based On The Contract, The Displayed Visualization Including Multiple Graphical Objects That Graphically Represent The At Least Some Data Of The Data Source"), a visualization of the at least some data of the data source may be displayed based on the contract. The displayed visualization may include multiple graphical objects that graphically represent the at least some data of the data source. Block 1104 may be followed by block 1106.

At block 1106 ("Receive Input Effective To Alter A First Graphical Object Of The Multiple Graphical Objects"), input effective to alter a first graphical object of the multiple graphical objects in the visualization may be received. Block 1106 may be followed by block 1108.

At block 1108 ("Determine That The Alteration To The First Graphical Object Implicates A Change To A First Data Object Of The At Least Some Data Of The Data Source"), it may be determined that the alteration to the first graphical object implicates a change to a first data object and/or a first graph object of the at least some data of the data source. Additionally or alternatively, it may be determined that the alteration to the first graphical object implicates a change to a first graphical object of the at least some data of the data source.

By way of example of the method 1100, the visualization may include an organizational chart of an organization. The first graphical object may include a block in the organizational chart. The block may identify a first individual in the organization as the first data object and/or the first graph object. Receiving input effective to alter the first graphical object at block 1106 may include receiving input effective to alter at least one of: a second graphical object in the visualization above the first graphical object in the visualization in the organizational chart to which the first graphical object in the visualization is connected, the second graphical object in the visualization representing a second individual in the organization; and a third graphical object in the visualization below the first graphical object in the organizational chart to which the first graphical object in the visualization is connected, the third graphical object in the visualization representing a third individual in the organization. Determining that the alteration implicates the change to the first data object and/or first graphical object may include determining that the alteration implicates at least one of: a change of an individual to whom the first individual reports to the second individual; and a change of an individual that reports to the first individual to the third individual.

Accordingly, some embodiments described herein determine and/or understand implicated changes to underlying source data based on changes to graphical objects in a visualization that represent the source data. In these and other embodiments, the implicated changes may be automatically made to the underlying source data or the implicated changes may be presented to the user (e.g., in a window on a display or in some other user interface) to manually make the implicated changes to the underlying source data. Alternatively or additionally, the alterations to the graphical objects in the visualization and/or the implicated changes to the underlying data may be saved apart from the underlying source data, e.g., in a visualization file such as the visualization file 400 of FIG. 4, such that the implicated changes may potentially be made later to the underlying source data, if desired. While the alterations and/or implicated changes may be saved apart from the underlying source data for a given visualization, the visualization may still be updated to reflect changes to the underlying source data alongside the alterations to the graphical objects in the visualization.

In at least one embodiment, the method 1100 may further include, prior to altering the first data object and/or the first graph object at the data source, mapping the first data object and/or the first graph object from the contract back to the data source to determine where the first data object and/or first graph object is located at the data source.

Alternatively or additionally, prior to altering the first data object and/or the first graph object at the data source, the method 1100 may further include: determining that the alteration implicates the change to the first data object and/or the first graph object; presenting a query that identifies the implicated change to the first data object and/or the first graph object and queries whether to make the implicated change to the first data object and/or the first graph object at the data source; and receiving an affirmative response to the query, where altering the first data object and/or the first graph object at the data source consistent with the alteration to the first graphical object in the visualization comprises implementing the implicated change at the data source in response to receiving the affirmative response.

Alternatively or additionally, prior to altering the first data object and/or the first graph object at the data source, the method 1100 may further include: receiving input effective to alter multiple graphical objects in the visualization, the multiple graphical objects in the visualization including the first graphical object and a second graphical object; determining that the alterations implicate changes to multiple data objects and/or multiple graph objects of the at least some data, the multiple data objects including the first data object and a second data object and the multiple graph objects including the first graph object and a second graph object; and locally storing the alterations. For example, the alterations and/or implicated changes may be stored on or by the client device 504 and/or on or by the server 502 and locally accessible to one or both of the client device 504 and the server 502.

In at least one embodiment, the method 1100 may further include presenting the implicated changes to a user. The method 1100 may further include receiving first user input effective to affirm a first one of the implicated changes that applies to the first data object and/or the first graph object. In this and other embodiments, altering the first data object and/or the first graph object at the data source consistent with the alteration to the first graph object in the visualization may include implementing the first one of the implicated changes at the data source in response to receiving the first user input. The method 1100 may further include receiving second user input effective to reject a second one of the implicated changes that applies to the second data object and/or the second graph object. The second data object and/or the second graph object at the data source may remain unchanged in response to receiving the second user input rejecting the second one of the implicated changes.

In at least one embodiment, the method 1100 may further include, in response to altering the first data object and/or the first graph object at the data source, refreshing the visualization to display the visualization based on updated data at the data source that includes the altered first data object and/or the altered first graph object.

Alternatively or additionally, the method 1100 may further include providing a set of one or more interactions with the visualization that allow configuring the visualization without editing the at least some data of the data source. For example, drop-down arrows or other user interface elements may be provided to selectively display or hide one or more portions of the visualization. Accordingly, in at least one embodiment, providing the set of one or more interactions with the visualization that allow configuring the visualization without editing the at least some data of the data source may include providing one or more user interface elements that allow a user to select whether one or more portions of the visualization are visible in the visualization.

Alternatively or additionally, the method 1100 may be combined, in whole or in part, with one or more of the other methods described herein, or with one or more portions of one or more of the other methods described herein. For example, the method 1100 may further include some or all of the method 900 of FIG. 9 and/or the method 1000 of FIG. 10.

Figure 12:
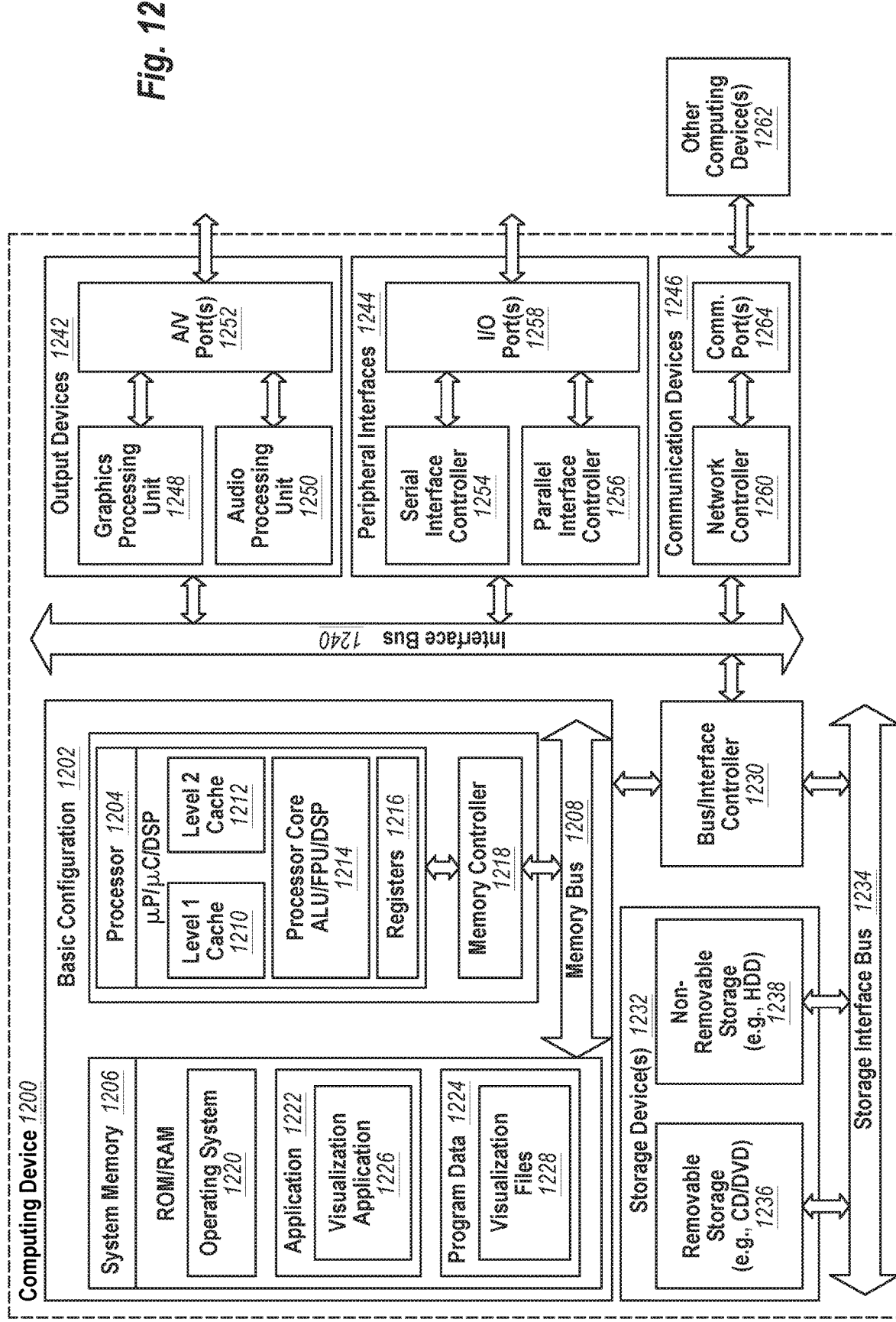
FIG. 12 is a block diagram illustrating an example computing device that is arranged for generating, customizing, and/or interacting with visualizations, all arranged in accordance with at least one embodiment described herein.

FIG. 12 is a block diagram illustrating an example computing device 1200 that is arranged for generating, customizing, and/or interacting with visualizations, arranged in accordance with at least one embodiment described herein. In a basic configuration 1202, the computing device 1200 typically includes one or more processors 1204 and a system memory 1206. A memory bus 1208 may be used to communicate between the processor 1204 and the system memory 1206.

Depending on the desired configuration, the processor 1204 may be of any type including, but not limited to, a microprocessor (µP), a microcontroller (µC), a digital signal processor (DSP), or any combination thereof. The processor 1204 may include one or more levels of caching, such as a level one cache 1210 and a level two cache 1212, a processor core 1214, and registers 1216. The processor core 1214 may include an arithmetic logic unit (ALU), a floating point unit (FPU), a digital signal processing core (DSP Core), or any combination thereof. An example memory controller 1218 may also be used with the processor 1204, or in some implementations the memory controller 1218 may include an internal part of the processor 1204.

Depending on the desired configuration, the system memory 1206 may be of any type including volatile memory (such as RAM), nonvolatile memory (such as ROM, flash memory, etc.), or any combination thereof. The system memory 1206 may include an operating system 1220, one or more applications 1222, and program data 1224. The application 1222 may include a visualization application 1226 that is arranged to generate, customize, and/or interact with visualizations, as described herein. The program data 1224 may include visualization files 1228 (which may include or correspond to the visualization file 400 of FIG. 4) as is described herein, or other visualization application data. In some embodiments, the application 1222 may be arranged to operate with the program data 1224 on the operating system 1220 such that one or more of the methods 900, 1000, 1100 of FIGS. 9-11 may be provided as described herein.

The computing device 1200 may have additional features or functionality, and additional interfaces to facilitate communications between the basic configuration 1202 and any involved devices and interfaces. For example, a bus/interface controller 1230 may be used to facilitate communications between the basic configuration 1202 and one or more data storage devices 1232 via a storage interface bus 1234. The data storage devices 1232 may be removable storage devices 1236, non-removable storage devices 1238, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 1206, the removable storage devices 1236, and the non-removable storage devices 1238 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 1200. Any such computer storage media or non-transitory computer-readable media may be part of the computing device 1200.

The computing device 1200 may also include an interface bus 1240 to facilitate communication from various interface devices (e.g., output devices 1242, peripheral interfaces 1244, and communication devices 1246) to the basic configuration 1202 via the bus/interface controller 1230. The output devices 1242 include a graphics processing unit 1248 and an audio processing unit 1250, which may be configured to communicate to various external devices such as a display or speakers via one or more A/V ports 1252. Diagrams, flowcharts, organizational charts, connectors, and/or other graphical objects generated by the visualization application 1226 may be output through the graphics processing unit 1248 to such a display. The peripheral interfaces 1244 include a serial interface controller 1254 or a parallel interface controller 1256, which may be configured to communicate with external devices such as input devices (e.g., keyboard, mouse, pen, voice input device, touch input device, etc.), sensors, or other peripheral devices (e.g., printer, scanner, etc.) via one or more I/O ports 1258. Such input devices may be operated by a user to provide input to the visualization application 1226, which input may be effective to, e.g., generate curved connectors, designate points as designated points of one or more curved connectors, relocate one or more designated points, and/or to accomplish other operations within the visualization application 1226. The communication devices 1246 include a network controller 1260, which may be arranged to facilitate communications with one or more other computing devices 1262 over a network communication link via one or more communication ports 1264.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, Infrared (IR), and other wireless media. The term "computer-readable media" as used herein may include both storage media and communication media.

The computing device 1200 may be implemented as a portion of a small-form factor portable (or mobile) electronic device such as a smartphone, a personal data assistant (PDA) or an application-specific device. The computing device 1200 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. A method to generate a visualization of data from a data source based on a contract, the method comprising:
   receiving input effective to select a visualization type of a plurality of different visualization types to apply to a visualization of data, wherein:
      the selected visualization type is associated with a contract;
      each of the plurality of different visualization types is associated with a specific contract of a plurality of contracts; and
      each corresponding contract includes a corresponding schema that specifies a set of data fields and one or more relationships between the data fields in the set of data fields to generate and display a corresponding visualization having a corresponding visualization type;
   mapping at least some data of a data source to the contract such that the contract is satisfied, the contract specifying that the data of the data source be in a graph format; and
   displaying the visualization of the at least some data of the data source based on the contract, the displayed visualization having the selected visualization type.

2. The method of claim 1, wherein:
   the mapping comprises identifying a plurality of specific data from a plurality of different data collections extracted from the data source, at least some of the specific data satisfying a first data field of the set of data fields specified by the schema of the contract and at least some other data of the specific data satisfying a second data field of the set of data fields specified by the schema of the contract; and
   when combined, the plurality of specific data from the plurality of different data collections form a set of data having a structure necessary to produce the visualization with the selected visualization type.

3. The method of claim 1, wherein:
   the data source comprises a first data source;
   mapping the at least some data of the data source to the contract comprises identifying at least first data extracted from the first data source and second data extracted from a second data source;
   the first data satisfies a first data field of the set of data fields specified by the schema of the contract and the second data satisfies a second data field of the set of data fields specified by the schema of the contract; and
   when combined, the first data and the second data form at least part of a set of data having a structure necessary to produce the visualization with the selected visualization type.

4. The method of claim 1, wherein the at least some data of the data source includes graph data, the method further comprising converting at least a portion of the graph data to a standardized graph format.

5. The method of claim 1, wherein the at least some data of the data source includes graph data comprising a plurality of nodes and one or more edges, each edge of the one or more edges indicating a relationship between two nodes of the plurality of nodes, the method further comprising, in response to receiving user input indicating that only related nodes of a particular node are to be displayed in the visualization:
   filtering information from the graph data based on the relationships indicated by the one or more edges; and
   updating the visualization based on the filtered graph data such that the visualization only includes data that is related to the particular node.

6. The method of claim 1, further comprising:
   receiving user input effective to update at least a portion of the visualization, the user input indicating that data associated with one or more nodes or one or more edges are to be updated; and
   updating the data of the data source associated with the portion of the visualization that is to be updated based on the user input, including updating a portion of the data of the data source that corresponds to data of the data source that is not displayed in the visualization.

7. The method of claim 1, wherein the contract comprises a first contract and the at least some data of the data source comprises a first portion of the data of the data source, the method further comprising, mapping a second portion of the data of the data source to a second contract such that the second contract is satisfied, the second contract specifying that the second portion of the data of the data source be in a tabular format, the visualization is displayed such that the second portion of the data of the data source is also displayed.

8. The method of claim 1, further comprising, prior to the mapping, translating the data of the data source from a first format to a standardized graph format.

9. The method of claim 8, wherein translating the data to the standardized format comprises translating the data of the data source to graph data.

10. The method of claim 8, wherein the first format comprises a tabular format.

11. A non-transitory computer-readable storage medium having computer-executable instructions stored thereon that are executable by a processor device to perform or control performance of operations comprising:
   receiving input effective to select a visualization type of a plurality of different visualization types to apply to a visualization of data, wherein:
      the selected visualization type is associated with a contract;
      each of the plurality of different visualization types is associated with a specific contract of a plurality of contracts; and
      each corresponding contract includes a corresponding schema that specifies a set of data fields and one or more relationships between data fields in the set to generate and display a corresponding visualization having a corresponding visualization type;
   mapping at least some data of a data source to the contract such that the contract is satisfied, the contract specifying that the data of the data source be in a graph format; and
   displaying the visualization of the at least some data of the data source based on the contract, the displayed visualization having the selected visualization type.

12. The non-transitory computer-readable storage medium of claim 11, wherein:
   the mapping comprises identifying a plurality of specific data from a plurality of different data collections extracted from the data source, at least some of the specific data satisfying a first data field of the set of data fields specified by the schema of the contract and at least some other data of the specific data satisfying a second data field of the set of data fields specified by the schema of the contract; and when combined, the plurality of specific data from the plurality of different data collections form a set of data having a structure necessary to produce the visualization with the selected visualization type.

13. The non-transitory computer-readable storage medium of claim 11, wherein:
   the data source comprises a first data source;
   mapping the at least some data of the data source to the contract comprises identifying at least first data extracted from the first data source and second data extracted from a second data source;
   the first data satisfies a first data field of the set of data fields specified by the schema of the contract and the second data satisfies a second data field of the set of data fields specified by the schema of the contract; and
   when combined, the first data and the second data form at least part of a set of data having a structure necessary to produce the visualization with the selected visualization type.

14. The non-transitory computer-readable storage medium of claim 11, wherein the at least some data of the data source includes graph data, the operations further comprising converting at least a portion of the graph data to a standardized graph format.

15. The non-transitory computer-readable storage medium of claim 11, wherein the at least some data of the data source includes graph data comprising a plurality of nodes and one or more edges, each edge of the one or more edges indicating a relationship between two nodes of the plurality of nodes, the operations further comprising, in response to receiving user input indicating that only related nodes of a particular node are to be displayed in the visualization:
   filtering information from the graph data based on the relationships indicated by the one or more edges; and
   updating the visualization based on the filtered graph data such that the visualization only includes data that is related to the particular node.

16. The non-transitory computer-readable storage medium of claim 11, the operations further comprising:
   receiving user input effective to update at least a portion of the visualization, the user input indicating that data associated with one or more nodes or one or more edges are to be updated; and
   updating the data of the data source associated with the portion of the visualization that is to be updated based on the user input including updating a portion of the data of the data source that corresponds to data of the data source that is not displayed in the visualization.

17. The non-transitory computer-readable storage medium of claim 11, wherein the contract comprises a first contract and the at least some data of the data source comprises a first portion of the data of the data source, further comprising, mapping a second portion of the data of the data source to a second contract such that the second contract is satisfied, the second contract specifying that the second portion of the data of the data source be in a tabular format, the visualization is displayed such that the second portion of the data of the data source is also displayed.

18. The non-transitory computer-readable storage medium of claim 11, the operations further comprising, prior to the mapping, translating the data of the data source from a first format to a standardized graph format.

19. The non-transitory computer-readable storage medium of claim 18, wherein translating the data to the standardized format comprises translating the data of the data source to graph data.

20. The non-transitory computer-readable storage medium of claim 18, wherein the first format comprises a tabular format.

* * * * *